(12) United States Patent
Wieland

(10) Patent No.: US 6,643,748 B1
(45) Date of Patent: Nov. 4, 2003

(54) PROGRAMMATIC MASKING OF STORAGE UNITS

(75) Inventor: Peter W. Wieland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/553,114

(22) Filed: Apr. 20, 2000

(51) Int. Cl.[7] .............................................. G06F 12/02
(52) U.S. Cl. ...................... 711/152; 711/163; 710/49; 707/8; 707/9
(58) Field of Search ........................ 710/104, 49, 314; 711/152, 163, 170; 707/8, 9

(56) References Cited

U.S. PATENT DOCUMENTS

| | | | | |
|---|---|---|---|---|
| 4,096,572 A | * | 6/1978 | Namimoto | 710/113 |
| 4,159,538 A | * | 6/1979 | Motsch | 365/49 |
| 5,253,328 A | * | 10/1993 | Hartman | 706/25 |
| 5,469,564 A | * | 11/1995 | Junya | 713/202 |
| 5,592,641 A | * | 1/1997 | Fandrich et al. | 711/103 |
| 5,673,317 A | * | 9/1997 | Cooper | 380/23 |
| 5,794,244 A | * | 8/1998 | Brosch et al. | 707/100 |
| 6,005,849 A | | 12/1999 | Roach et al. | |
| 6,031,842 A | | 2/2000 | Trevitt et al. | |
| 6,094,699 A | * | 7/2000 | Surugucchi et al. | 710/314 |

OTHER PUBLICATIONS

Gharachorloo et al., Hiding Memory Latency Using Dynamic Scheduling In Shared–Memory Multiprocessors. Association for Computing Machinery, 1992, pp. 22–23.*

* cited by examiner

Primary Examiner—B. James Peikari
(74) Attorney, Agent, or Firm—Amin & Turocy, LLP

(57) ABSTRACT

A system and method are described to programmatically manage access between one or more nodes and a plurality of associated devices, such as shared storage units. Each node is programmed to include a data structure, which identifies whether an associated device is to be within the scope of the respective node. The data structure and may include persistent and/or temporary lists. Each device may be programmatically masked relative to the node by dynamically modifying the data structure of the node, such as by employing a predetermined interface.

44 Claims, 12 Drawing Sheets

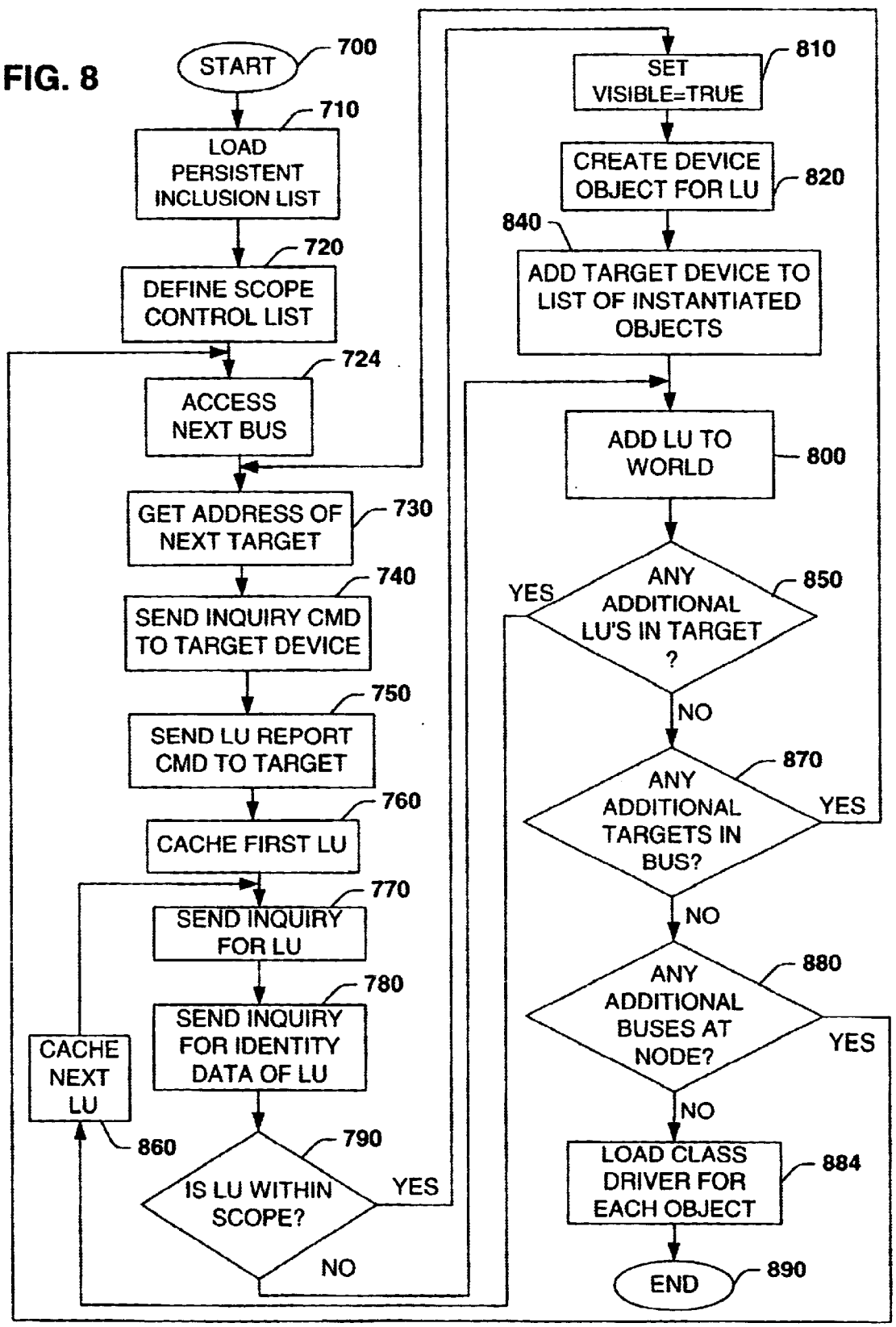

PROGRAMMATIC MASKING OF STORAGE UNITS

TECHNICAL FIELD

The present invention generally relates to controlling access to devices and, more particularly, to a system and method for programmatically managing access by a host system to one or more devices operatively connected to the host system.

BACKGROUND

In order to remain competitive and to manage technological changes, computer systems are becoming increasingly powerful and more complex. A primary motivation for this has been large database applications and more data-intensive applications. As systems have increased in complexity, so have demands for an improved data storage and communications capabilities. Computer architectures historically were founded on the principal that storage devices were "owned" by a host computer or node to which they were attached. More recently, computer architecture models are moving increased intelligence to data storage devices and channels to facilitate data transmission and storage.

Channels and networks are two basic types of data communications topologies typically employed between processors and between a processor and peripherals. A "channel" provides a direct or switched point-to-point connection between communicating devices. The channel's primary task is to transport data at the highest possible data rate with the least amount of delay. Channels typically perform simple error correction in hardware. A "network," by contrast, is an aggregation of distributed nodes (e.g., workstations, mass storage units, etc.) with its own protocol that supports interaction among these nodes. Typically, each node contends for the transmission medium, and each node must be capable of recognizing error conditions on the network and must provide the error management required to recover from the error conditions.

A hybrid type of communications interconnect is Fibre Channel, which attempts to combine the benefits of both channel and network technologies. Fibre Channel protocol is being developed and adopted under the American National Standard for Information Systems (ANSI). Briefly stated, Fibre Channel is a switched protocol that allows concurrent communication among workstations, super computers and various peripherals. The total network bandwidth provided by Fibre Channel may be on the order of a terabit per second. Fibre Channel is capable of transmitting frames at rates exceeding 1 gigabit per second in both directions simultaneously. It is also able to transport commands and data according to existing protocols, such as Internet protocol (IP), small computer system interface (SCSI), high performance parallel interface (HIPPI), and intelligent peripheral interface (IPI) over both optical fiber and copper cable.

The evolution and standardization of Fibre Channel has had a profound impact related to data storage. Fibre Channel permits both more rapid access and access at a greater distance (e.g., in excess of 10 km) than other conventional data storage topologies. Because Fibre Channel permits greater distance between devices, it also has advantages in disaster recovery situations, as storage devices can be placed remotely. One particular data storage arena in which Fibre Channel is prompting substantial interest is shared storage systems, such as storage area networks (SANs), through which a plurality of hosts may share access to a network of associated storage devices.

A typical SAN architecture is formed of multiple storage systems and a logically isolated network. The storage systems may include virtually any type of storage device, such as disk, tape, etc. The network portion includes adapters, wiring, bridges, hubs, switches and directors. Briefly stated, the adapters attach servers and peripherals to the wiring (e.g., optical fibers or other wiring) in the network. The bridges convert from one protocol to another, such as from SCSI to Fibre Channel. The hubs, switches and directors provide a central connection point and routing capabilities in a typical SAN data bus. A SAN environment enables a plurality of storage devices to be considered a shared storage pool capable of being accessed by multiple host machines. As more than one device may require access to a given storage device at the same time, difficulties may arise in managing access to the storage devices of the SAN.

A hardware-based switching architecture has been proposed to selectively control access to storage devices connected to a SAN. For example, Fibre Channel switches are employed to create zones that restrict the ability of individual Fibre Channel nodes on the SAN to communicate with each other and associated storage devices. In a storage architecture in which multiple storage devices are organized as an array of logical units (e.g., within a cabinet), another approach is to implement hardware-based LUN masking. In LUN masking, switches are employed, usually in the SAN, to control access between a host machine and selected logical units corresponding to the associated storage devices. For example, a Fibre Channel switch determines for which Fibre Channel node and which logical unit number a particular command is targeted and performs masking at the logical unit number level.

Because insufficient standards have been developed for the interface used to control the hardware switches, however, it may be difficult to effectively implement LUN masking in most systems. In particular, the management interface for each storage device and host machine usually varies between manufacturers. Consequently, different interfaces usually are required when a system comprises storage devices and/or host machines from different manufacturers. Moreover, the hardware itself (e.g., the switches and cabinet) often may be prohibitively expensive for smaller organizations that may desire to employ them for shared storage. Also, where different host machines connected a SAN system employ different operating systems, difficulties may arise when the different machines attempt to access the same storage device (or logical unit) simultaneously. Additionally, if multiple hosts are connected to the same storage devices, there is an increased likelihood of file systems being corrupted, such as through periodic monitoring of the devices by each host.

SUMMARY

The present invention relates to a system and method for programmatically managing access between a node and one or more associated devices, such as storage units. One or more data structures may be programmed at the node to identify whether an associated device is to be within the scope of the node. The node's scope is determined based on the data structure of the node, which may be dynamically changed by programmatically modifying the data structure.

In accordance with an aspect of the present invention, an interface is employed to identify devices attached to the node. The node, for example, has a first data structure which indicates devices attached to the node. The node also has a second data structure indicating whether an associated device is to be hidden or exposed relative to the node. For example, the second data structure may be in the form of an inclusion list, indicating which device(s) are within the node's scope, and/or an exclusion list, indicating which identified device(s) are not within the node's scope. A programmatic interface may be employed to modify the second data structure in a selected manner. As a result, selected attached devices may be dynamically brought into and/or out of the node's scope. In a shared storage system, the interface simplifies management of the shared storage devices and mitigates device conflicts. Boot time may also be reduced for a node configured in accordance with the present invention, as the operating system need access and mount associated devices based on the second data structure of the node.

In accordance with another aspect of the present invention, one or more controllers on a node may be operatively coupled to a shared storage system having multiple target storage units. Each controller employs a programmable data structure, which defines associated devices operatively attached to the node that are to be functionally exposed or hidden relative to the controller. The data structure may include persistent and/or temporary components. The temporary and/or persistent components may be modified by an interface employed in a predetermined manner. A device object is created at the controller for each associated device, as defined by the data structure of the controller. Each device object is linked to a higher-level object, such as a class driver, for controlling operation of the associated device in response to commands from the controller.

In accordance with another aspect of the present invention, a device object for an associated device is removed (or added) dynamically based on changes to the data structure of the node. When a device object is removed, for example, no higher-level device object (e.g., a class driver) is loaded for the respective device object and the corresponding device is no longer within the node's scope. As a result, traditional communication mechanisms (e.g. read and/or write commands) are inhibited from communicating with the device. A device object for a second node, however, may be created for the associated device (e.g., by programmatically modifying the data structure of the second node) to establish a communications channel between the second node and the associated device. In this way, an aspect of the present invention may be employed to facilitate programmatically swapping devices between a set of interconnected nodes.

According to yet another aspect of the present invention, a link between the device object and its higher-level device object of an associated device may be dynamically broken or added according to whether the associated device is identified by the data structure of the node. When the link between the device object and its higher-level device object is broken, the associated device is no longer within the node's scope, such that access to it by the node is blocked. A new higher level device object may be created and, in turn, linked to the device object to expose the associated device relative to the node, such as in response to programmatically changing in the data structure of the node.

BRIEF DESCRIPTION OF THE DRAWINGS

FIG. 8 is a flow diagram illustrating a methodology for initializing masking criteria of a node in accordance with the present invention;

DETAILED DESCRIPTION OF THE INVENTION

The present invention relates to a system and method for programmatically managing access between a node and one or more associated devices, such as functional units of storage. One or more data structures may be programmed at the node to identify whether an associated device is to be within the node's scope. The node's scope defines whether each associated device is functionally exposed or hidden relative to the node. The node's scope may be dynamically changed by programmatically modifying the data structure in accordance with an aspect of the present invention.

Figure 1:
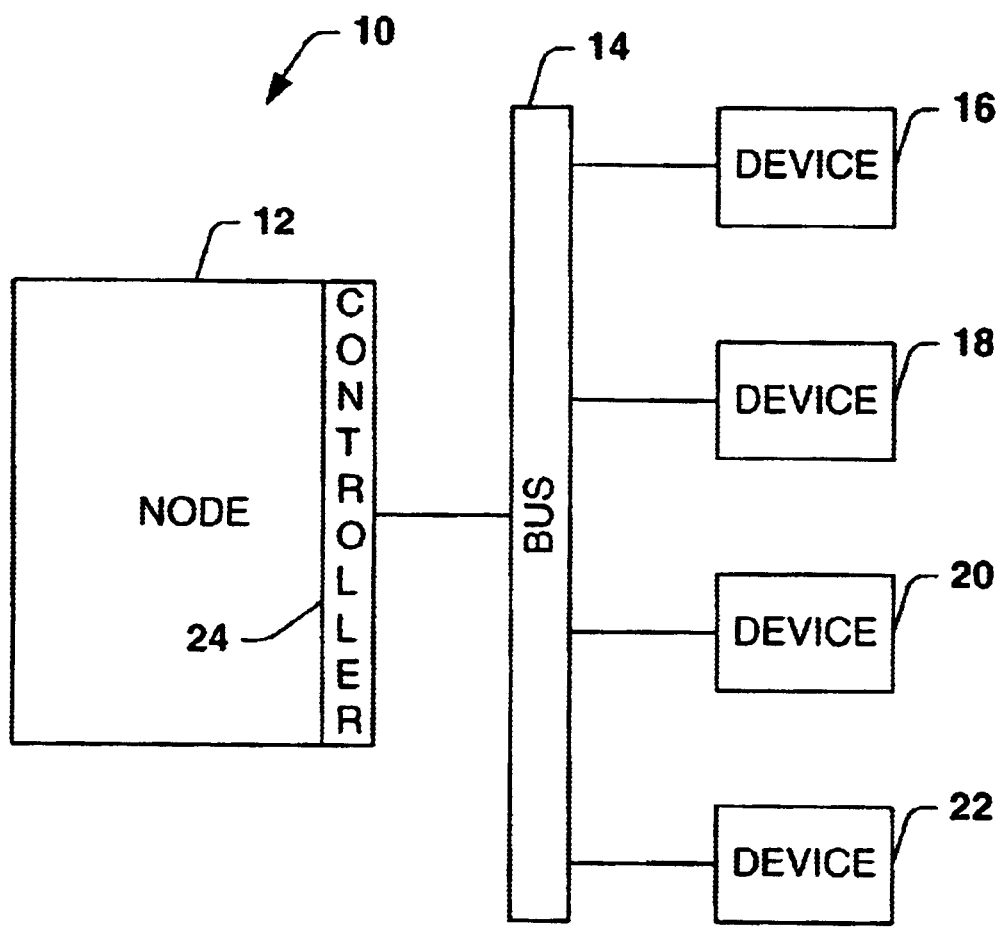
FIG. 1 is schematic block representation of a system in accordance with the present invention.

FIG. 1 is a simplified block representation of a system 10 which may be programmed to implement masking in accordance with the present invention. The system includes a node 12 operatively coupled through a bus 14 to a plurality of devices 16, 18, 20, and 22. The node is a computer, such as a client machine, a work station, a server, or other machine. The devices 16, 18, 20, and 22 may be in the form of functional units of storage (e.g., hard disk drive, CD-ROM, DVD, tape, etc.) or other peripheral devices which may be used in conjunction with the node 12. The bus 14 may be in the form of a network, channels or other connection means for enabling data communication between the node 12 and the storage devices 16, 18, 20, and 22.

In accordance with one aspect of the present invention, the node 12 includes controller 24 having an associated data structure, such as in the form of one or more programmable lists, which defines scope criteria for determining masking parameters employed by the node. It is to be understood and appreciated that, unless specifically stated otherwise or context requires a different interpretation, the term "masking" as used herein and the appended claims is to be construed in the broadest sense, and that all such constructions of the terms are intended to fall within the scope of the hereto appended claims. For example, "masking" a device relative to a node may be inclusive of both bringing the device within the scope of the node and taking the device out of the node's scope. When a device is not within the node's 12 scope, communication between the node and the device is blocked, as the device is hidden relative to upper layers of software in the node. In contrast, when a device is within the node's 12 scope, the node may access the device by employing an appropriate communications protocol.

Figure 2A:
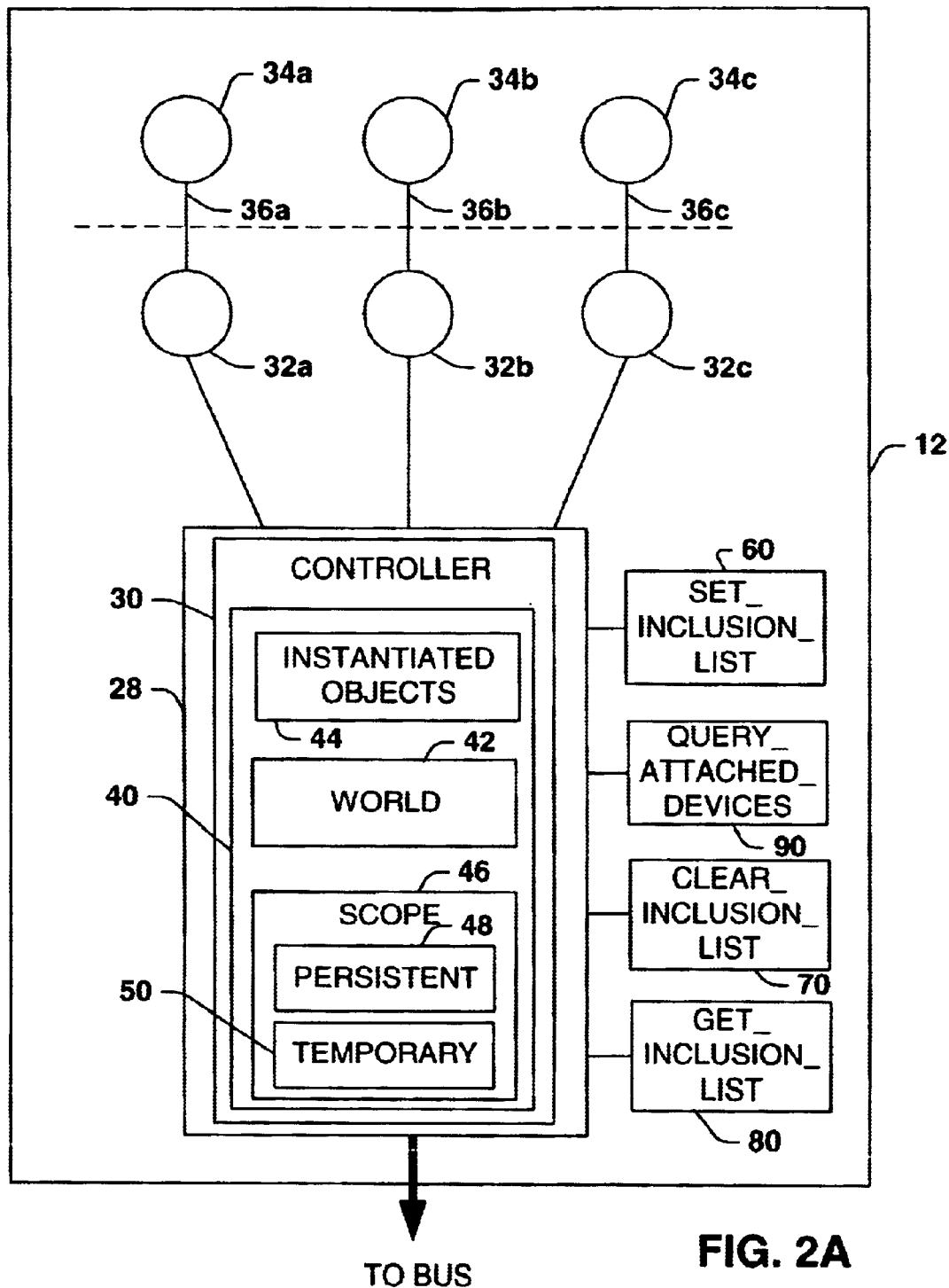
FIG. 2A is a functional block diagram of a system programmed in accordance with the present invention, illustrating a first system condition.
Figure 2B:
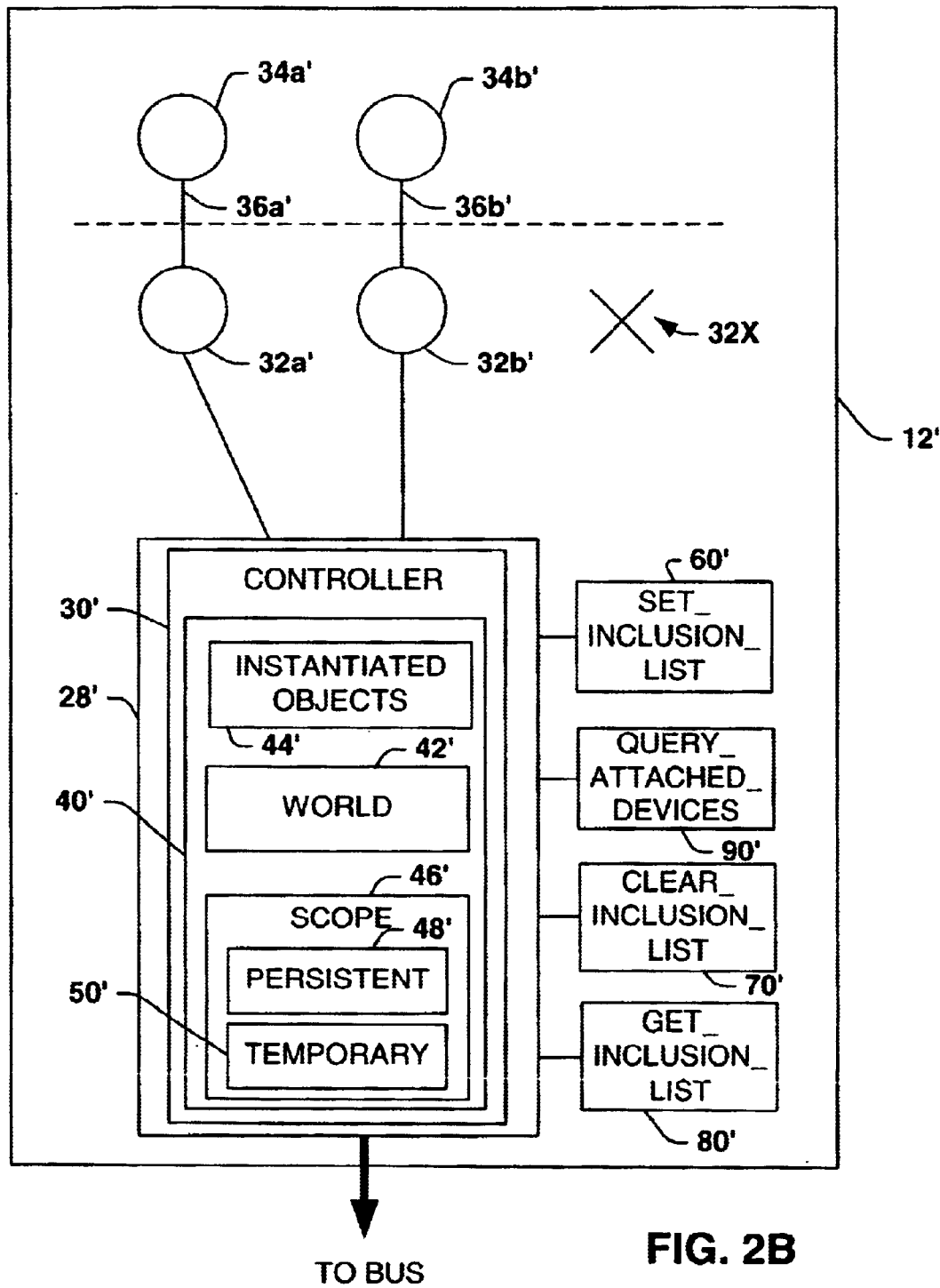
FIG. 2B is functional block diagram of the system of FIG. 2A, illustrating a second system condition in accordance with an aspect of the present invention.
Figure 2C:
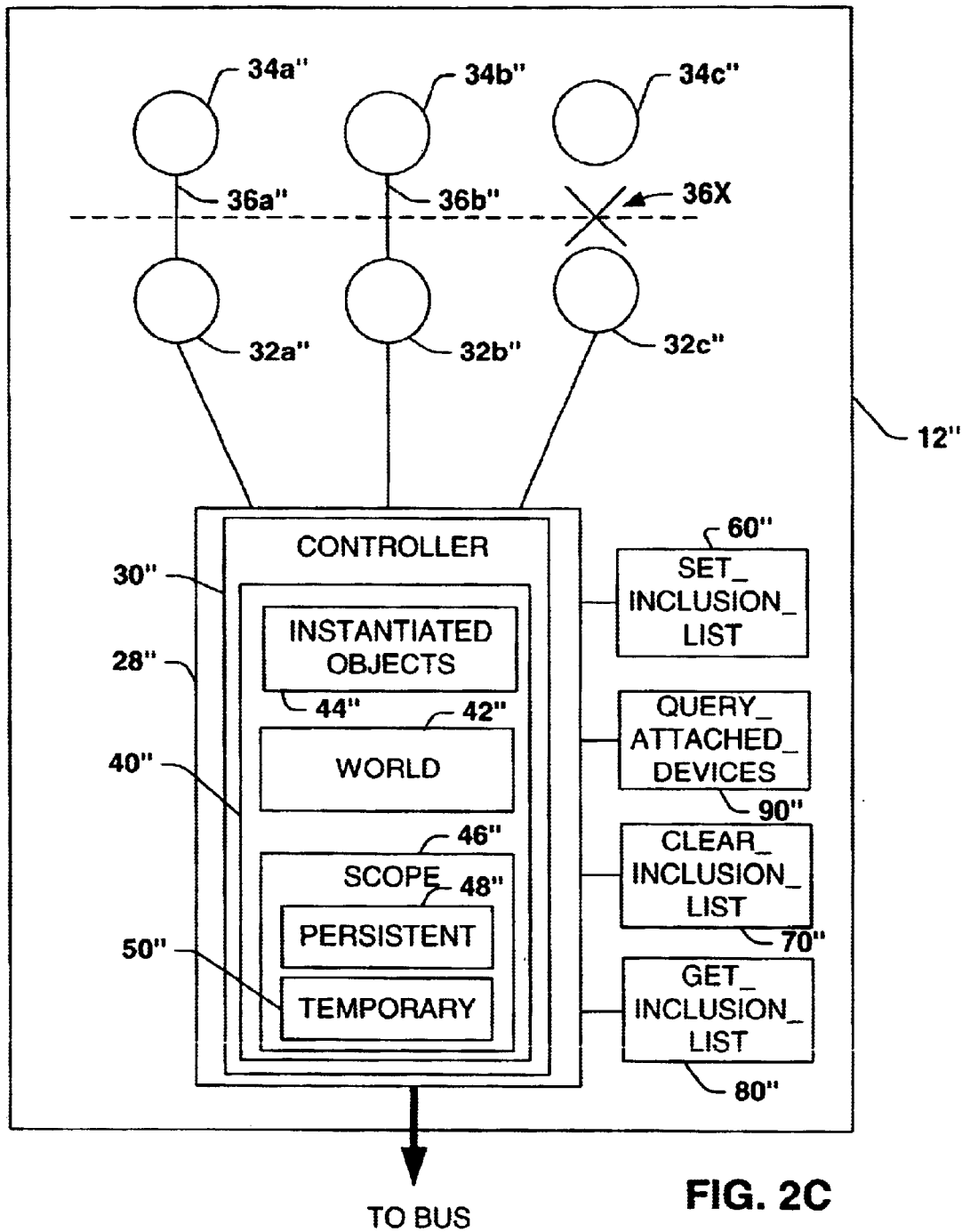
FIG. 2C is functional block diagram of the system of FIG. 2A, illustrating a third system condition of a device in accordance with another aspect of the present invention.

FIGS. 2A–2C are functional block diagrams representing features of the operating system (e.g., driver stack) of a node 12 which may be programmed and/or configured to mask communication paths between the node and devices (not shown) operatively coupled to the node. Referring to FIG. 2A, the node 12 includes a host bus adapter 28, which, for example, may be a SCSI bus adapter. The host bus adapter 28 includes a controller 30 configured and/or programmed to manage communication paths or channels between the node 12 and devices operatively connected to the node through an associated bus. Specifically, the controller 30 creates a device object 32a, 32b, 32c (collectively referred to as "device objects 32") for devices connected to the bus. Each device object 32 is a functional device object that identifies a device including, for example, its location (e.g., a logical unit number) and operating characteristics of the device. It is to be appreciated that the term device, as used herein, is intended to be broadly construed so as to, for example, correspond to a hardware device or a functional unit of the device, such as a logical unit of data storage associated with a storage device.

Another higher-level device object 34a, 34b, 34c (collectively referred to as "higher-level device objects 34") is loaded for each respective device object 32a, 32b, 32c. Each higher-level device object 34a, 34b, 34c is associated the respective device object via an operative link indicated at 36a, 36b, 36c, respectively. The higher-level device objects 34 are physical device objects, such as, for example, class drivers, which control the behavior of the associated device by providing appropriate commands to or from a corresponding device in response to requests from the controller 30 of the node 12. After a higher level device object 34 is loaded and linked to an associated device object 32, the corresponding device is within the node's scope (e.g., the node may access the corresponding device).

The node 12 or, more particularly, the controller 30, includes a data structure 40 for storing information indicative of the devices and their operative relationships with the node. By way of example, one aspect of the data structure 40 corresponds to a database or list 42 identifying all devices operatively connected to the controller's bus (hereinafter the "world list 42"). The world list 42 includes devices that are, in accordance with the present invention, functionally exposed and hidden relative to the node 12. Another aspect of the data structure 40 is a database or list 44 identifying all devices having device objects that are instantiated. That is, the instantiated list of objects 44 identifies those devices operatively connected to the controller 30 (or the node 12) for which a device object 32 exists.

A third aspect of the data structure 40 is a scope control data structure 46, suitably in the form of list (hereinafter referred to as "scope control list 46"), that stores a working map of masking criteria for the node 12. The scope control list 46 is programmable so that the masking criteria may be modified to dynamically bring selected devices within and/or take selected devices out of the scope of to the node 12 without requiring system boot. The masking criteria may include, for example, an exclusion list, an inclusion, or both. The lists (inclusion or exclusion) may be arranged as any form of data structure. An inclusion list defines devices (such as according to their logical unit numbers or other identifying characteristics) that are within the scope of the node. In contrast, an exclusion list identifies devices that are not within the node's scope; all devices not in the exclusion list are within the node's scope. Accordingly, if an exclusion list is employed when a new device is operatively coupled to the node 12 it will be exposed relative to the node, such as by employing a Plug-n-Play (PNP) control. Whether to provide the masking criteria in the form of an inclusion list or an exclusion list, generally speaking, is a matter of design choice, as each may have advantages depending on the configuration of the system and the reason masking is being implemented.

For purposes of brevity, the following example describes the scope control list 46 as an inclusion list, in which devices on an inclusion list are within the node's scope. It is to be appreciated that, however, the principles set forth herein are equally applicable to both inclusion and exclusion lists. In addition, while the scope control list 46 has been described as being operatively associated with a controller 30 of a node, it is to be appreciated that other data storage arrangements may be used. For example, a common scope control data structure may be maintained for the node 12 to indicate globally which devices are masked relative to the node 12. Alternatively, a scope control list may be maintained separately for each bus.

In accordance with an aspect of the present invention, two types of inclusion (and/or exclusion) lists may be operatively associated with the scope control list 46, namely, a persistent inclusion list 48 and a temporary inclusion list 50. The terms "persistent" and "temporary" relate to storage characteristics of the respective lists. A temporary inclusion list, for example, does not survive a system reboot or disabling of a corresponding controller. The temporary list 50, for example, is stored in temporary memory of the node (e.g., a volatile storage device), such as RAM, and is maintained so long as the system is running and the controller 30 remains enabled. The persistent inclusion list 48 preferably is able to survive system reboot or crash as well as other similar situations, such as power loss or when the controller 30 or node 12 is disabled. The persistent list, for example, is stored in persistent memory (e.g., non-volatile storage), such as the system registry. Both the persistent and temporary inclusion lists 48 and 50, respectively, are programmable so that, for example, an administrator or higher-level service may modify a selected list, which results in dynamically changing the node's 12 scope. Several interfaces (e.g., application programming interfaces (API's)) may be provided to, for example, view the content of selected lists or to programmatically change the content of a selected list or lists.

By way of example, an interface 60, such as a SET_INCLUSION_LIST interface (or API), is provided to enable programmatic masking of a device relative to the node 12, in accordance with the present invention. An agent, such as a higher level application (or service) or an administrator, employs the interface 60 to modify an inclusion (and/or exclusion) list. The interface 60 causes corresponding identifying data for one or more devices to be removed from (or added to) an appropriate inclusion list (persistent or temporary). The instructions provided to the interface 60, such as by a higher level application or system administrator, determines the type and extent of changes to the list.

In addition to controlling whether a particular device is within the node's 12 scope, it also may be desirable to delete the scope control list entirely so that the masking characteristics associated with that list do not affect the behavior of the system (e.g., no masking is attempted). To implement such an operation, for example, relative to an inclusion list, an appropriate interface or API, such as a CLEAR_INCLUSION_LIST interface 70, may be provided. An administrator (manually) or a higher level application (operation initiated) may employ the interface 70 by indicating which inclusion list (or lists) is to be deleted. The effect of this interface 70 is determined according to the type of scope control list(s). For example, if only one list exists and it is deleted by employing the CLEAR_INCLUSION_LIST interface, the system reverts to its default behavior, which, for example, may be to expose every device visible to the system. Alternatively, if the there are mixed scope control lists (e.g., there are both inclusion and exclusion lists), the system behavior will vary according to which list is deleted. For example, if an inclusion list is deleted via the interface, then every device identified in the exclusion list is excluded. If an exclusion list is deleted from the mixed list, then everything identified in the inclusion list is included The operation of modifying the node's scope occurs, for example, in accordance with one of the approaches described below. That is, the device objects themselves may be removed or added (see, e.g., FIG. 2B) or the links between the device objects and respective class drivers may be broken or created (see, e.g., FIG. 2C).

In order to determine a current state of an inclusion (or exclusion) list, a node, an administrator, or an application may employ another interface, such as a GET_INCLUSION_LIST interface 80, to return information indicative of the current inclusion list (temporary and/or persistent). The GET_INCLUSION_LIST interface 80 may be accessed at the node by any application or user.

Another interface, QUERY_ATTACHED_DEVICES 90, also may be employed to return a list of devices attached to the controller along with identifying characteristics of the respective devices. This, for example, may be based on a retrieval of inquiry data in response to SCSI inquiry and may be accessed by any user or application associated with the node.

FIG. 2B illustrates a functional representation of an approach that may be employed, in accordance with a particular aspect of the present invention, to control whether a device is within the node's 12 scope. Similar reference numbers, to which a prime symbol (') has been added, refer to corresponding components previously identified with respect to FIG. 2A. In particular, this approach relates to manipulating (e.g., adding or removing) an associated device object 32c' to implement masking at a node relative to an associated device. By way of example, in order to remove a presently exposed device from the node's 12' scope, the device object (e.g., 32c') associated with the particular device is removed. This is illustrated in FIG. 2B by reference character 32X, which indicates an absence of the device object 32c (FIG. 2A). The removal of a device object may be initiated, for example, by employing the SET_INCLUSION_LIST interface 60' to remove a selected device from the inclusion list. The scope control list 46' incorporates the changes made to the inclusion list. The interface 60' instructs a Plug-n-Play (PNP) module or a private interface (not shown) to remove the respective device object, Removal of the device object 32c, in turn, results in a removal or unloading of the corresponding class driver 34c (FIG. 2A). The device also is removed from the list of instantiated objects 44'. Because no device object nor a class driver is associated with device, there is no useful channel through which any higher level objects or drivers associated with node 12 may communicate with the device and, therefore, access by the node to the device is effectively blocked.

In order to bring a currently unexposed device within the node's 12 scope, a device object 32 is programmatically created at the node for the device. With reference to FIG. 2B, this may be implemented, for example, by a higher level application or an administrator employing the SET_INCLUSION_LIST interface 60' to add to an inclusion list appropriate identity data for the device. The interface 60' instructs a PNP control or other interface to add a device object for the device and a class driver 34c for the device is loaded and, in turn, operatively linked to device object 32c (see FIG. 2A). The device may be added to either the persistent or temporary inclusion list 48', 50' depending on, for example, the reasons that the communications channel between the node and the device is being established. When the device object 32c is created, the device is also added to the list of instantiated objects 44. If the device being added is a new device to the system, it also may be added to the world list 42.

An administrator or higher level application or module also may employ the CLEAR_INCLUSION_LIST interface 70' to delete a scope control list. As mentioned above, whether a device is brought into or out of the node's 12' scope depends on whether the list is an inclusion or exclusion list.

FIG. 2C is a functional representation of another approach that may be employed at the node 12", in accordance with the present invention, to programmatically control whether a device is within the node's 12" scope. Similar reference numbers to which a double-prime symbol (") has been added, refer to corresponding components previously identified with respect to FIG. 2A. In this approach, a communications channel between the node and a device may be masked by controlling the operative link 36" between a device object 32" and corresponding higher level device object 34" for the device. Referring back to FIG. 2A, for example, if a device object 32c and corresponding class driver object 34c exist for a device, the device may be brought out of the node's 12 scope by dynamically breaking (or removing) the link 36c between the device object and class driver. This is shown in FIG. 2C by reference number 36X, which indicates the absence of the link 36c (FIG. 2A). A device that is not within the node's scope but that is already part of the world 42" may be brought into the node's 12" scope, for example, by adding a link 36c between the device object 32c and the class driver 34c for the device, as shown in FIG. 2A.

The masking may be implemented in a similar manner as the approach described with respect to FIG. 2B. Briefly stated, an administrator or higher level application employs an appropriate interface, such as the SET_INCLUSION_LIST interface 60". to modify an inclusion list (temporary 50" or permanent 48"). The scope control list 46" incorporates changes to the respective inclusion list. The interface 60" also instructs a private interface or PNP control to add or break the link 36" according to whether the device is being functionally hidden or exposed relative to the node. If neither a device object nor a class driver have been created for a device that is to be exposed relative to the node 12"

(e.g., a new device being connected to the system), a corresponding device object 32c and class driver 34c are created and linked, as previously shown and described with respect to FIG. 2A. A flag associated with each device object 32 also may be set to a logical value (TRUE or FALSE) to indicate whether the device object corresponds to a visible device that is within the node's scope.

Figure 3:
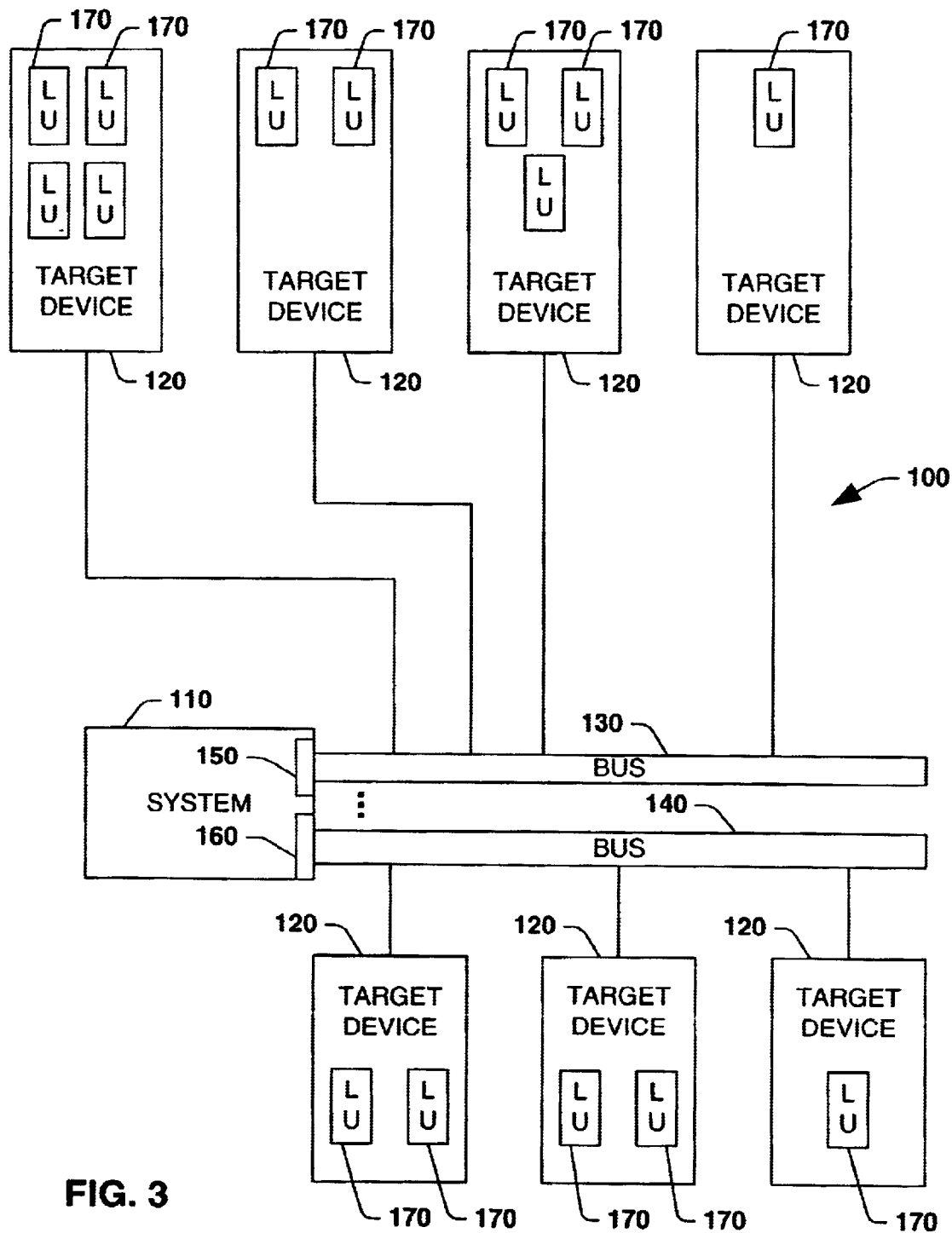
FIG. 3 is a functional block diagram of a system illustrating a node coupled to a plurality of targets through a plurality of buses, which may be configured in accordance with the present invention.

FIG. 3 illustrates an example of system environment 100 in which a node 110 is operatively coupled to a plurality of target devices 120 through a plurality of buses 130 and 140. The node 110 includes a controller 150, 160 operatively associated with each respective bus 130, 140 for establishing and controlling communication paths (channels) between the node and each target device. Each target device 120 has a target address associated therewith and includes one or more logical units 170. The logical units 170, for example, provide interfaces to functional storage units of the respective target devices 120. Each logical unit 170 has an associated logical unit number (or other identifying characteristics). The node 110 and controllers 150 and 160 are configured to function substantially identically to the node and controllers shown and described with respect to FIGS. 2A–2C. In particular, the node 110 may include a persistent inclusion list stored in the system registry identifying one or more logical units that are within the node's scope.

At system boot or during initialization, a persistent inclusion list is employed to establish communication paths or channels between the node 100 and each device 120 or logical unit 170 indicated by the list. By way of example, at initialization the node 110 or the controllers 150 and 160 sets a scope control list based on the persistent inclusion list stored in system registry. If no persistent list is provided, the node may be configured to, by default, either functionally expose every device operatively connected to the node or expose no devices. The following example assumes that an initial persistent inclusion list is provided.

Each controller 150, 160 scans the bus and sends an inquiry to each target 120 on each respective bus 130, 140, such as to determine the logical unit numbers associated with each target device. The controllers 150 and 160 may perform an additional inquiry to determine the type of device associated with each logical unit and to obtain particular identity data for each logical unit, such as, for example, serial number. Each controller 150, 160 further checks its scope control list to determine if, based on the identity data, a device or logical unit is within the list. If the logical unit is within the scope of the controller, a device object is created for that logical unit and the logical unit may be marked as visible, such as by setting an appropriate flag associated with the device object. The logical unit characteristics associated with each device object also are added to the list of instantiated objects. If a logical unit is not within the node's 110 scope, however, no corresponding device object is created. In either situation, however, identifying characteristics of each logical unit are added to the world list of the node 110. This process is repeated until each logical unit 170 of each target device 120 of each bus 130, 140 is processed accordingly.

Under certain circumstances, such as at system boot, it may be desirable to programmatically set a null scope control list in which all entries are removed from the scope control list. For example, a null inclusion list results in all devices 120 or logical units 170 being removed from the node's 110 scope. In contrast, a null exclusion list results in all devices attached to the bus being included in the scope. In such a situation, the node 110 does not have any devices identified in an inclusion list (persistent or temporary) and, therefore, no devices are identified by the scope control list. If the controller does not have an inclusion list, no checking of devices operatively connected to the bus is performed during a bus scan. This substantially mitigates boot time, as it is not necessary to implement procedures to verify proper device operation or check file systems associated with the device. Boot time also may be reduced by initially programming the inclusion list of a node to identify only a relatively small number of devices, so that few devices are within the node's scope (e.g., when the system is attached to a large amount of data storage, such as SAN environment). Path overload and device conflicts also are mitigated.

Figure 4:
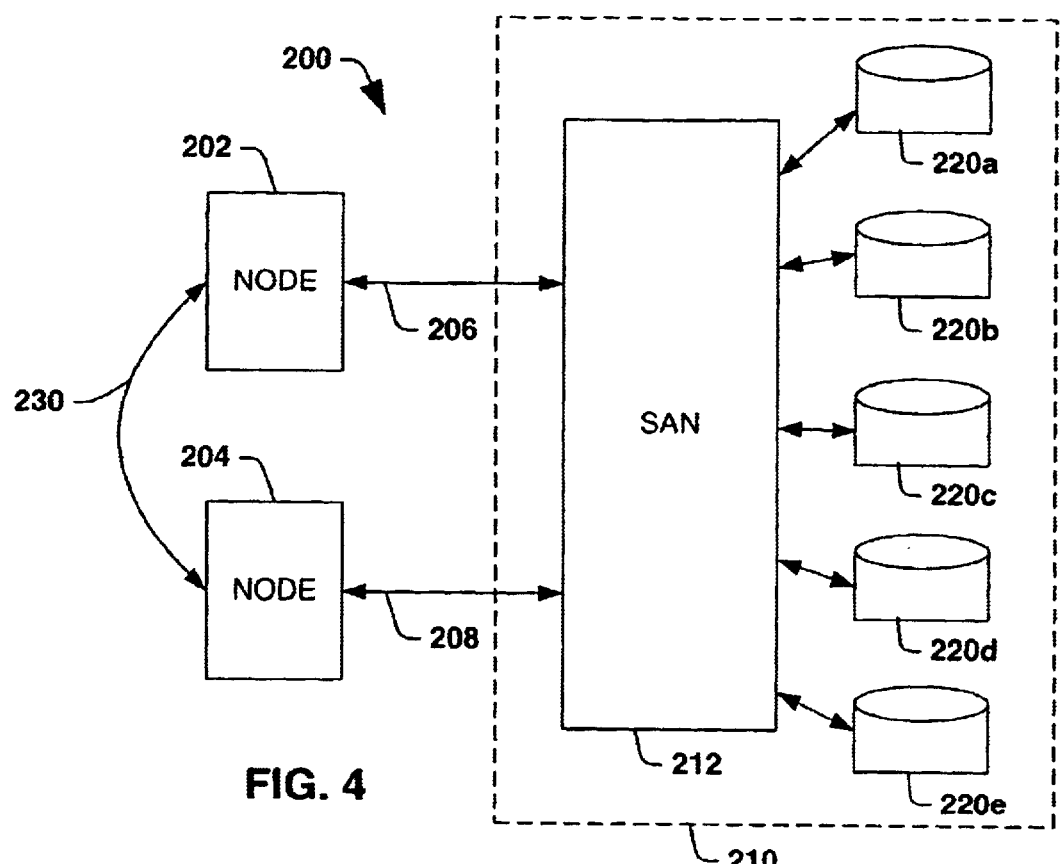
FIG. 4 is block representation of a system having a plurality of nodes connected to a shared storage system in accordance with the present invention.

FIG. 4 is a functional representation of an exemplary system arrangement 200, in accordance with the present invention, in which a plurality of nodes 202 and 204 are connected via connections 206 and 208, respectively, to a shared storage system 210. The shared storage system 210, for example, includes a storage area network (SAN) 212 operatively coupled to a plurality of storage units 220a, 220b, 220c, 220d, and 220e (collectively referred to as "storage units 220"). Each storage unit 220 may be, for example, a disk, tape, or any other form storage media (optical or electronic).

The SAN 212, for example, includes an arrangement of adapters, bridges, hubs, switches and directors to control routing and connecting between the storage units 220 and the nodes 202 and 204. Briefly stated, the adapters attach nodes or servers and peripherals to the wiring (e.g., optical fibers or other wiring) in the SAN 212. The bridges convert from one protocol to another, such as from Fibre Channel to IP or SCSI to Fibre Channel. The hubs, switches and directors provide a central connection point and routing capabilities in the SAN data bus. In order to increase system bandwidth and, in turn, data transfer rates, the SAN 212 may employ a Fibre Channel fabric to connect devices in a cross-point switched configuration, including storage units 220, and nodes 202 and 204.

An optional communications link 230 may be provided between the nodes 202 and 204 to permit communication between the nodes. The communications link 230 may be in the form of a network (LAN, WAN), a telecommunications link, or other mechanism by which the nodes 202 and 204 and/or users thereof may communicate. The communications links also can be run over the SAN using any number of inter-process communications protocols (e.g., IP HIPPI, VI, etc.).

By way of example, the nodes 202 and 204 employ SCSI protocol via communications links 206 and 208 to the SAN 212, which employs Fibre Channel to the storage units 220. Each node 202, 204 is programmed to include a data structure, such an inclusion and/or exclusion list, for defining which storage units 220 are within the scope of the respective node. The data structure may include persistent and/or temporary lists. A higher level application or agent performs management concerning which storage units are within the scope or not within the scope for each node. As mentioned above, the inclusion list of each node may be programmatically modified to dynamically mask access between each of the nodes and selected storage units.

For example, the node 202 may have an inclusion list that contains storage unit 220a and node 204 may have an inclusion list that contains storage units 220b and 220c. Before the node 202 accesses the storage unit 220b, the node 204 may be directed to relinquish ownership. This may be implemented by a higher level application or an administrator employing an interface (SET_INCLUSION_LIST) to remove the storage unit 220*b* from the inclusion list of the node 204. Modifying the inclusion list in this manner results in a corresponding change in the scope control list. An interface or PNP control may be employed to block access by the node 204 to the storage unit 220*b* at the device object level, such as according to one of the implementations shown and described with respect to FIGS. 2A–2C. When the storage unit 220*b* is not within the node's 204 scope, the node 204 (or a user thereof) may communicate with the node 202 via communications link 230 indicating that ownership of the storage unit has been released. An administrator or higher level application (either at node 202 or at node 204 via the communications link 230) may then employ an interface (e.g. SET_INCLUSION_LIST) to add the storage unit 220*b* to the inclusion list of the node 202. The scope control list is, in turn, modified accordingly. The interface also instructs another interface or PNP control to bring the device 220*b* within the node's 202 scope, such as by issuing appropriate commands to add a device object corresponding to the storage unit 220*b* and/or to link a device object to a corresponding class driver for the storage unit 220*b*. Because, a device object of the node 202 is linked to an appropriate class driver, access to the respective storage unit 220*b* is enabled (e.g., the device is within the node's 202 scope). Access by the nodes 202 and 204 relative to the other storage units 220 may be programmatically masked in a similar manner.

An administrator, for example, may provide each node 202, 204 with an appropriate level of storage commensurate with the demands of each node. In addition, each node 202, 204 may be programmed to access the same storage unit(s) 220 so as to enable a reduction in storage requirements by the system 200 as a whole. As a result, there is no need to store duplicate data for multiple nodes. Masking access in this manner also mitigates path overload and device conflicts that may arise should more than one node try to simultaneously access a storage unit.

Figure 5:
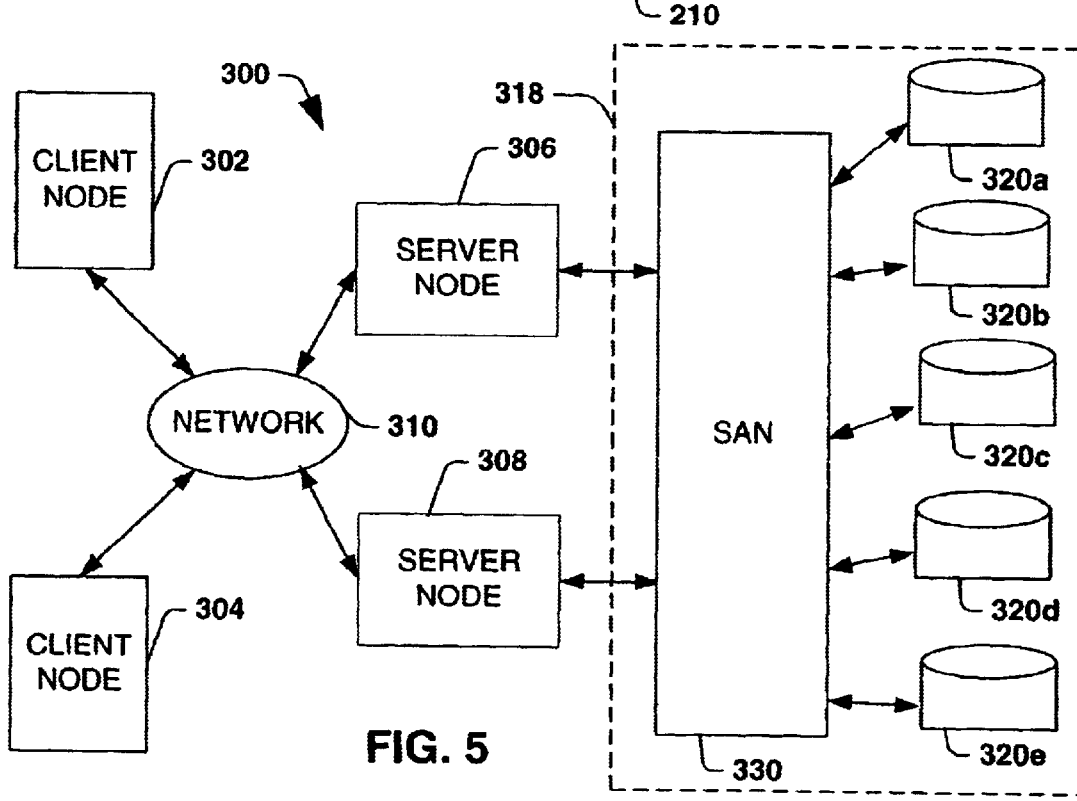
FIG. 5 is a block representation of a system having a plurality of nodes connected through a network to a shared storage system in accordance with the present invention.

FIG. 5 is an example of another system arrangement 300, in accordance with the present invention, wherein a plurality of client nodes 302 and 304 are linked to a plurality of server nodes 306 and 308 via a conventional network infrastructure 310, such as a LAN or WAN. The server nodes 306 and 308 are operatively coupled to a shared storage system 318. In particular, the server nodes 306 and 308 are coupled to a plurality of storage units 320*a*, 320*b*, 320*c*, 320*d*, and 320*e* (collectively referred to as "storage units 320") through a SAN 330, which may include Fibre Channel fabric topology.

In accordance with an aspect of the present invention, each of the client nodes 302 and 304 includes one or more programmable data structures, such as in the form of an inclusion and/or exclusion list, to define which storage units 320 are within the scope of each respective client node. As mentioned above, the data structure may be in the form of temporary and/or persistent inclusion lists. The data structure also may correspond to a null inclusion list, indicating that no storage units are within the scope of a respective client node. It is to be appreciated that each of the server nodes 306, 308 also may be programmed to include inclusion (or exclusion) lists for further controlling access to selected storage units. In accordance with the present invention, one or more storage units may be dynamically masked relative to each node 302, 304, 306, 308 by employing an appropriate interface to programmatically add or remove one or more storage units from an inclusion list of a respective node.

By way of example, the client node 302 has an inclusion list that identifies storage units 320*a* and 320*c*, and the node 304 has a null inclusion list (e.g., all devices on the bus are excluded from its scope). In order for the node 304 to access the storage unit 320*c*, the storage unit is added to its inclusion list (or removed from its exclusion list). This may be implemented, for example, by a higher level application or an administrator employing an interface (SET_INCLUSION_LIST) to add the storage unit 320*c* to the inclusion list of the node 304. The addition may be persistent or temporary according to which inclusion list (temporary or persistent) the storage unit is added. Modifying the inclusion list in this manner causes a corresponding change in the scope control list of the node 304. A PNP control also is instructed to, for example, create a device object for the storage unit (assuming one does not already exist). The device object is linked via a communications path to a class driver for communicating command instructions to the storage unit 320*c* (e.g., providing read or write commands in response to I/O requests).

It also may be desirable to take the storage unit 320*c* out of the node's 302 scope prior to exposing the unit to the other node 304. One of the server nodes 306 or 308 or the client node 304, thus, may communicate with the client node 302 through the network infrastructure 310 and request that the node 302 relinquish ownership of the storage unit 320*c*, such as by programmatically masking access by the node 302 relative to the storage unit. An interface (SET_INCLUSION_LIST) may be employed to initiate the masking at the client node 302, such as according to any of the implementations shown and described herein. Because the storage unit 320*c* is functionally hidden relative to the client node 302, path overload and possible conflicts, which may occur if two or more nodes simultaneously accessed the device, are mitigated.

Figure 6:
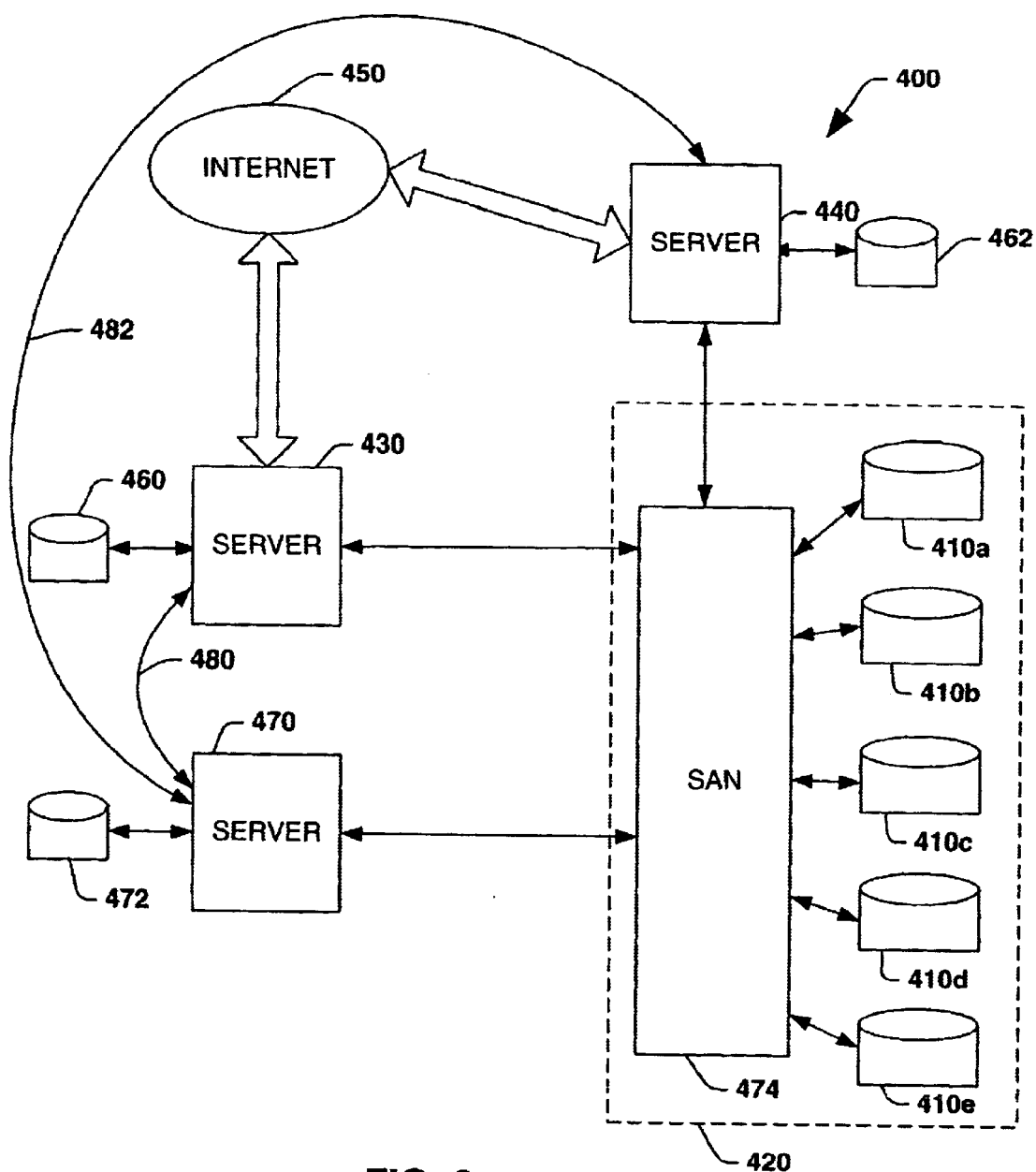
FIG. 6 is block representation of an Internet-based system having a plurality of nodes connected to a shared storage system in accordance with the present invention.

FIG. 6 illustrates an example of an Internet-based system 400 which may employ masking, in accordance with the present invention, to dynamically manage access to a plurality of storage units 410*a*, 410*b*, 410*c*, 410*d*, and 410*e* (collectively referred to as "storage units 410") of a shared storage system 420. A plurality of Internet servers 430 and 440 are operatively coupled to the Internet 450. Each server 430, 440 also includes a respective storage device 460, 462 physically associated with each server. The servers 430 and 440, for example, correspond to Internet servers of an E-commerce business, which receive orders and perform pre-selected aspects of transaction processing for a particular area of the business. Another server 470 is a master server for performing additional transaction processing or data management (e.g., data mining), such as based on transaction data obtained from each of the Internet servers 430, 440. The master server 470 also includes a storage device 472 that is owned exclusively by the server. All servers 430, 440 and 470 are operatively coupled to the storage units 410 through a SAN 474 of the shared storage system 420.

In accordance with the present invention, each server 430, 440, 470 may be programmed to include a data structure, such as in the form of an inclusion and/or exclusion list, which identifies masking criteria for each respective server. As mentioned above, the list may include persistent and/or temporary lists that identify whether a particular storage device is to be within the scope of a respective server. A storage unit 410 may be programmatically added to or removed from the data structure of one of the servers 430, 440, 470, in accordance with an aspect of the present invention, to dynamically mask the storage unit relative to a respective server.

By way of example, the Internet server 430 corresponds to a server for receiving and processing orders from the Internet 450 related to a first area of an Internet business. The server 430 may store transaction data in its associated storage device 460, but require additional drive space to further process the data. The shared storage system 420 provides sufficient storage, such as storage unit 410b, to perform the application-intensive data processing. In order to access the storage unit 410b, the server programmatically brings the storage unit within the scope of the server 430.

In accordance with the present invention, an interface (SET_INCLUSION_LIST) may be employed, such as by an administrator or a high level application, to add the storage unit 410b to a selected inclusion list of the server 430 (e.g., temporary or persistent). The scope control list of the server 430 is modified according to the changes to the temporary inclusion list. In addition, a private interface or PNP control is activated to bring the storage unit 410b into the scope of the server 430, such as according to one of the exemplary implementations shown and described with respect to FIGS. 2A–2C. While the storage unit 410b is within the scope of the Internet server 430, the server may employ the storage unit to process and store transaction data, as it would any device owned by the server. After the processing is completed, the server 430 may relinquish ownership of the storage unit 410b, such as by employing the interface (SET_INCLUSION_LIST) to remove the storage unit from its temporary inclusion list.

Because, in the foregoing example, the storage unit 410b is being accessed for a particular purpose, namely, processing and transferring data to another machine, the storage unit may be added to the temporary inclusion list. Accordingly, if the server 430 or its associated controller crashes during processing, the storage units on its temporary inclusion list will not continue to be within the scope of the server 430. Instead, the server would have to renegotiate ownership of such storage units to continue processing the transaction data.

The server 430 (or a user thereof) also may communicate with the master server 470 (or its user) via communications link 480 to advise that it has relinquished access to the storage unit 410b and that the master server 470 may take ownership of the storage unit 410b, such as by adding the storage unit to its inclusion list. Programmatic instructions may accompany the communication to initiate the SET_INCLUSION_LIST interface at the master server 470 for adding the storage unit 410b to the master server's inclusion list. It is to be appreciated that any mode of communication may be employed to communicate the information about the internet server 430 and the data provided at the storage unit 410b, including a manual or automated mechanism, wired or wireless, etc. After the master server 470 programmatically brings the storage unit 410b within its scope, it may process and store data to additional memory 472 owned exclusively by it, keep the data on the storage unit 410b, or it may transfer the data to a different one of the storage units 410 after negotiating ownership thereof. The server 440 may communicate with the master server 470 via communications link 482 to provide status information about the server 440 and provide status information and/or instructions related to associated storage units 410.

Advantageously, large amounts of data may be built by individual Internet server machines 430 and 440 and be transferred to storage units 410 of the shared storage system 420 for processing by the master server 470. The master server 470, for example, may be employed as a file server for the entire system 400. In addition, this methodology may be utilized to efficiently create back-up copies of selected data, which data may be maintained remotely located storage units 410 based on the logistical constraints of the SAN. For example, Fibre Channel permits up to at least 10 kilometers between storage devices and host computers that may access such devices.

Figure 7:
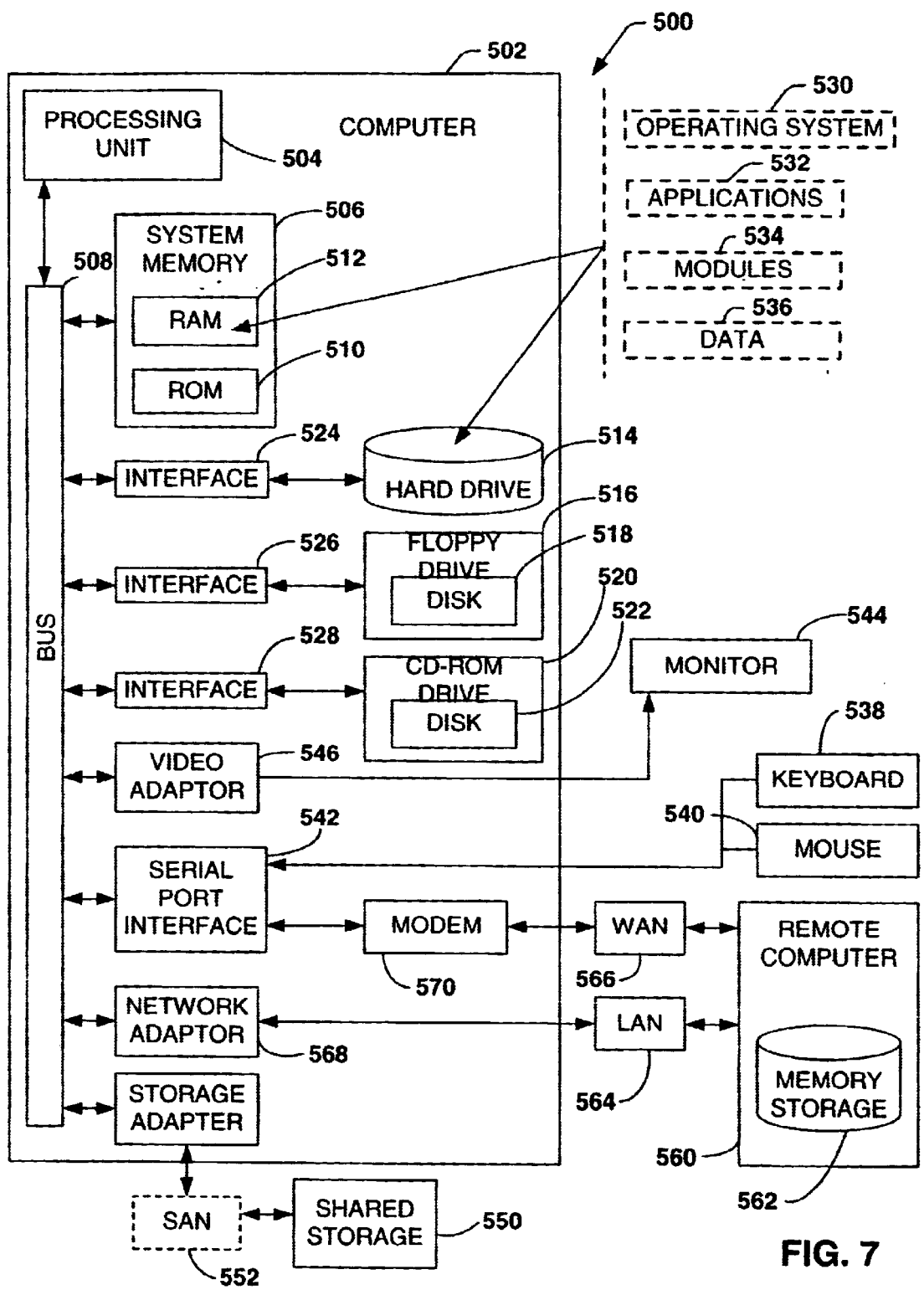
FIG. 7 is an exemplary operating environment for a system configured in accordance with the present invention.

In order to provide a context for the various aspects of the invention, FIG. 7 and the following discussion are intended to provide a brief, general description of a suitable computing environment in which the various aspects of the present invention may be implemented. While the invention has been described above in the general context of computer-executable instructions of a computer program that runs on a host computer or node in various system arrangements, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers, such as where multiple processors are operatively associated with a plurality of shared storage units (e.g., segmented disk storage). In a distributed computing environment, program modules may be located in both local and remote memory storage devices. However, it is to be appreciated that masking, in accordance with the present invention, is implemented at a low level (e.g., in the driver stacks) within each computer or node so as to provide masking capabilities as described herein.

With reference to FIG. 7, an exemplary system 500 for implementing the various aspects of the invention includes a conventional server computer 502, including a processing unit 504, a system memory 506, and a system bus 508 that couples various system components including the system memory to the processing unit 504. The processing unit 504 may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 504.

The system bus 508 may be any of several types of bus structure including a memory bus or memory controller, a peripheral bus, and a local bus using any of a variety of conventional bus architectures such as PCI, VESA, Microchannel, ISA, and EISA, to name a few. The system 500 memory includes read only memory (ROM) 510 and random access memory (RAM) 512. A basic input/output system (BIOS), containing the basic routines that help to transfer information between elements within the server computer 502, such as during start-up, is stored in ROM 510.

The server computer 502 further includes a hard disk drive 514, a magnetic disk drive 516, e.g., to read from or write to a removable disk 518, and an optical disk drive 520, e.g., for reading a CD-ROM disk 522 or to read from or write to other optical media. The hard disk drive 514, magnetic disk drive 516, and optical disk drive 520 are connected to the system bus 508 by a hard disk drive interface 524, a magnetic disk drive interface 526, and an optical drive interface 528, respectively. The drives and their associated computer-readable media provide nonvolatile storage of data, data structures, computer-executable instructions, etc. for the server computer 502. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention. Additionally, each of the devices 514–522, which form part of the server computer 502 are considered to be "owned" by the server computer. However, it is to be appreciated that such devices alternatively may be remotely located relative to the server computer 502 and shared with one or more other computers, with both the server computer and other computers being programmed to employ masking in accordance with the present invention.

A number of program modules may be stored in the drives and RAM 512, including an operating system 530, one or more application programs 532, other program modules 534, and program data 536. The operating system 530 in the illustrated computer is, for example, the "Microsoft Windows 2000" Server operating system, although it is to be appreciated that the present invention may be implemented with other operating systems or combinations of operating systems.

A user may enter commands and information into the server computer 502 through a keyboard 538 and a pointing device, such as a mouse 540. Other input devices (not shown) may include a microphone, a joystick, a game pad, a satellite dish, a scanner, or the like. These and other input devices are often connected to the processing unit 504 through a serial port interface 542 that is coupled to the system bus 508, but may be connected by other interfaces, such as a parallel port, a game port or a universal serial bus (USB). A monitor 544 or other type of display device is also connected to the system bus 508 via an interface, such as a video adapter 546. In addition to the monitor, a computer typically includes other peripheral output devices (not shown), such as speakers, printers etc.

The server computer 502 also may be operatively coupled to a shared storage system 550, such as through a SAN 552. For example, the server computer 502 is connected to the SAN 552 through a storage interface or adapter 554. The SAN is illustrated in phantom to indicate that it is optional, as the server computer 502 may be directly coupled to the shared storage system 550 through an appropriate storage adapter.

The server computer 502 may operate in a networked environment using logical connections to one or more remote computers, such as a remote client computer or node 560. The remote computer 560 may be a workstation, a server computer, a router, a peer device or other common network node, and typically includes many or all of the elements described relative to the server computer 502, although, for purposes of brevity, only a memory storage device 562 is illustrated in FIG. 7. In addition, the remote computer 562 may be programmed to employ masking in accordance with the present invention, relative to one or more devices operatively associated therewith, including part of the server computer 502 or the shared storage system 550 connected to the server computer through the SAN 552. The logical connections depicted in FIG. 7 include a local area network (LAN) 564 and a wide area network (WAN) 566. Such networking environments are commonplace in offices, enterprise-wide computer networks, intranets and the Internet.

When used in a LAN networking environment, the server computer 502 is connected to the local network 564 through a network interface or adapter 568. When used in a WAN networking environment, the server computer 502 typically includes a modem 566, or is connected to a communications server on the LAN, or has other means for establishing communications over the WAN 566, such as the Internet. The modem 570, which may be internal or external, is connected to the system bus 508 via the serial port interface 542. In a networked environment, program modules depicted relative to the server computer 502, or portions thereof, may be stored in the remote memory storage device 562 and/or in the shared storage device 550. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 502 or remote computer 560, unless otherwise indicated. Such acts and operations are sometimes referred to as being computer-executed. It will be appreciated that the acts and symbolically represented operations include the manipulation by the processing unit 504 of electrical signals representing data bits which causes a resulting transformation or reduction of the electrical signal representation, and the maintenance of data bits at memory locations in the memory system (including the system memory 506, hard drive 514, floppy disks 518, CD-ROM 522, and shared storage system 550) to thereby reconfigure or otherwise alter the computer system's operation, as well as other processing of signals. The memory locations where such data bits are maintained are physical locations that have particular electrical, magnetic, or optical properties corresponding to the data bits.

Figure 9A:
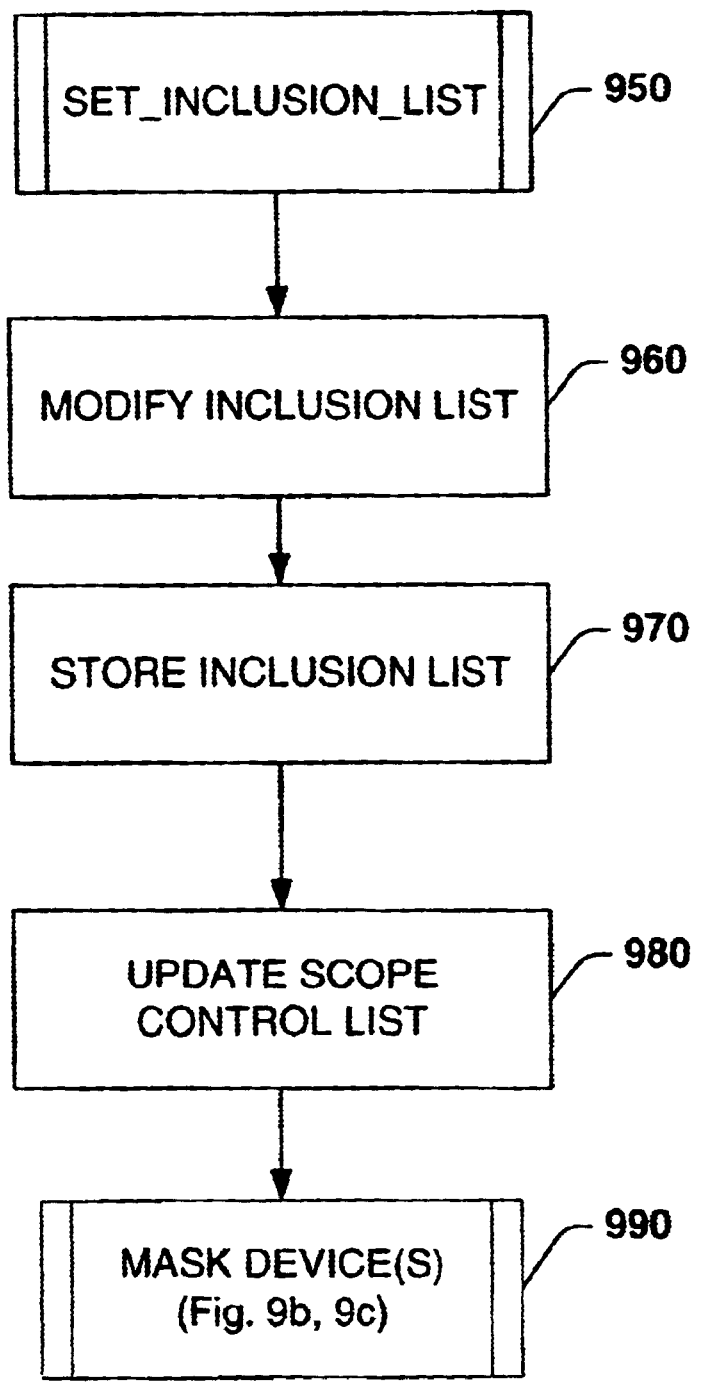
FIG. 9A is a flow diagram illustrating a methodology for masking access by a node relative to a device in accordance with the present invention.
Figure 9B:
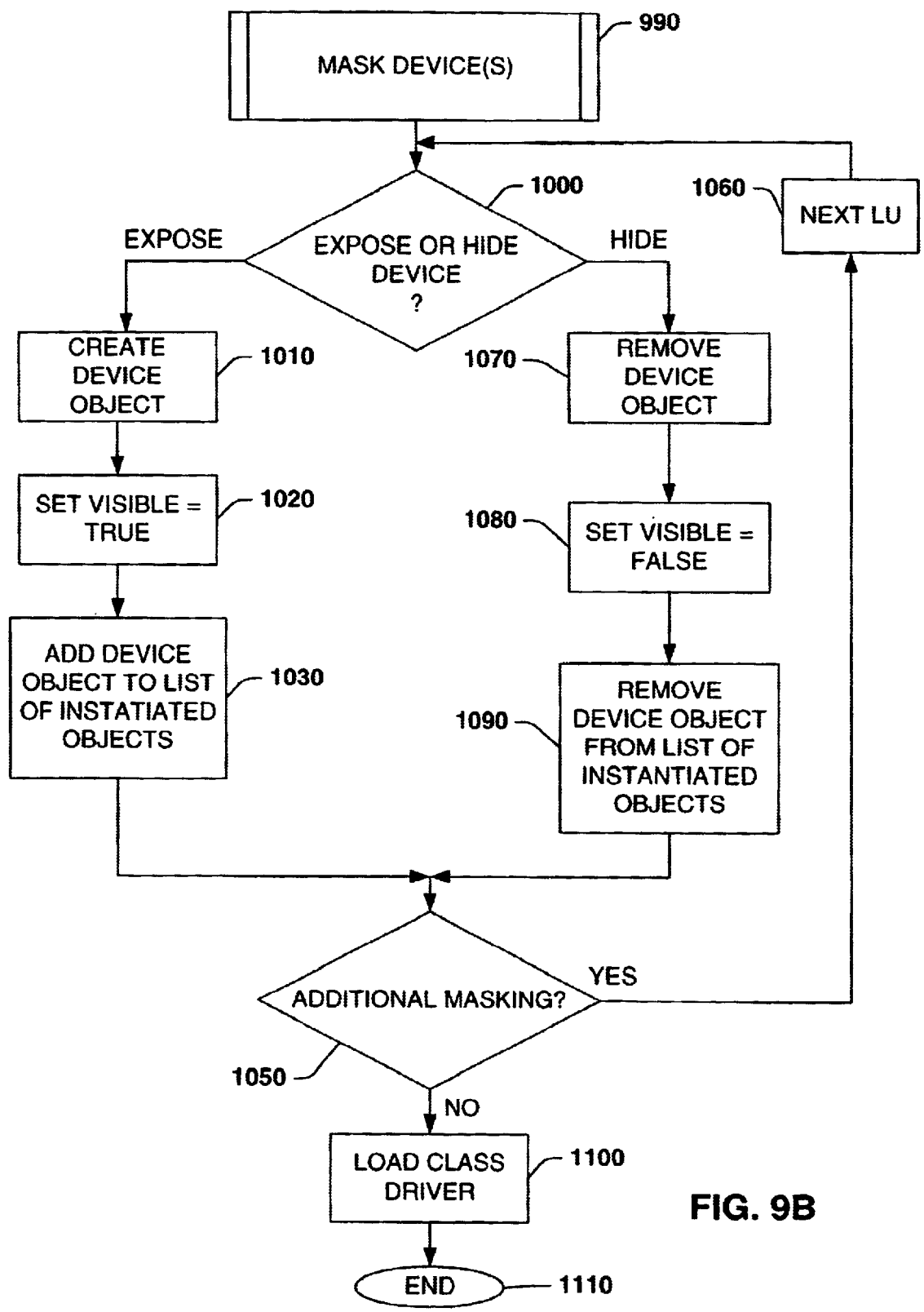
FIG. 9B is a flow diagram illustrating, in greater detail, part of the process of FIG. 9A in accordance with an aspect of the present invention.
Figure 9C:
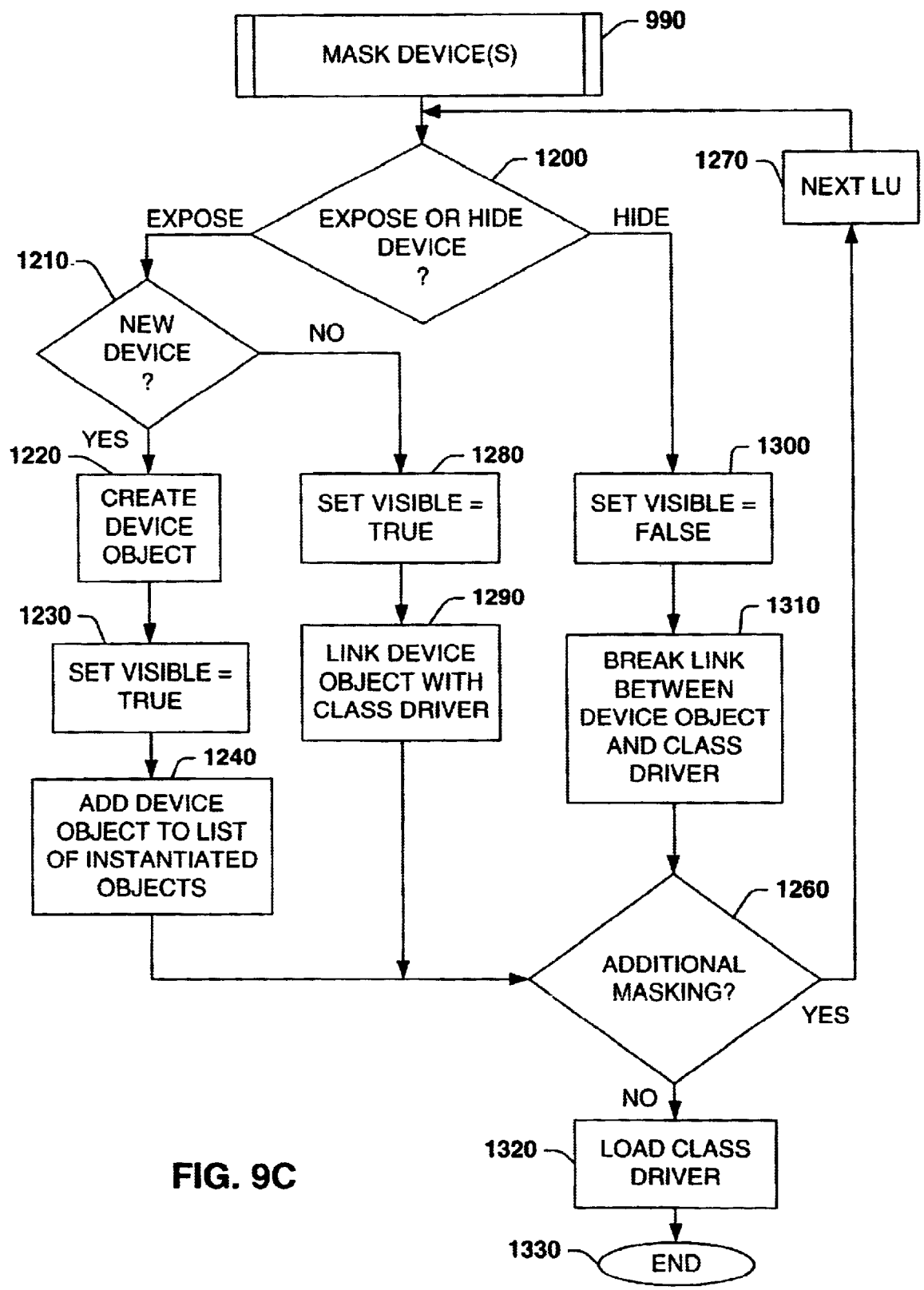
FIG. 9C is a flow diagram illustrating, in greater detail, part of the process of FIG. 9A in accordance with another aspect of the present invention.

In view of the foregoing examples of an operating environment and exemplary system arrangements, a masking methodology, in accordance with the present invention, will be better appreciated with reference to flow diagrams depicted in FIGS. 8–9c. The exemplary methodology illustrated in each of these figures is described with respect to a system arrangement similar to that shown in FIG. 3. Briefly stated, each target device has an associated bus address (equivalent to a Fibre Channel node), with each target further including one or more logical units (LU's). Each LU provides an interface to a corresponding aspect of an associated device, such as to part (e.g., a segment or disk) of a target device. Each LU has an associated logical unit number (LUN) or other identifying characteristics for identifying the logical unit of the respective target device. This example assumes that the node is programmed to include a persistent inclusion list, which may be stored in the system registry. The persistent inclusion list identifies which devices initially are to be within the node's scope. For purposes of brevity, the following description describes the masking methodology as employing only inclusion lists, although exclusion lists may alternatively or additionally be implemented in accordance with the present invention. It is to be appreciated that each node may be programmed, in accordance with the present invention, to implement the methodology illustrated in FIGS. 8–9c.

Referring to FIG. 8, a methodology is illustrated for initially establishing masking criteria for a node relative to each of a plurality of target devices operatively connected to the node. The process begins at step 700 in which the system or node is initialized, for example, at system boot. Just prior to boot, no devices are within the node's scope. The process proceeds to step 710, in which a persistent inclusion list is loaded from memory. Next, at step 720, the scope control list is defined based on the persistent inclusion list. From step 720, the process proceeds to step 724, in which the node accesses the next bus associated with the node, which in this situation is a first bus. The process then performs an inquiry concerning each target device operatively coupled to the bus.

At step 730, the node gets or loads the address of a next target associated with the bus being scanned. Next, an inquiry is made relative to the target device (step 740) operatively connected to the node. In particular, the inquiry command, which may employ a SCSI command protocol, is addressed to logical unit zero of the current target of the bus being scanned. Each target device includes at least a logical unit zero that is capable of responding to basic commands, such as an inquiry about the other LU's associated with the target device. Next, at step 750, a report LUN's commands is sent to logical unit zero of the current target device of the current bus being scanned. This causes logical unit zero to respond by providing a list of all LU's associated with that target. If, for some reason, a report identifying the LU's was not provided in response to the inquiry at step 750, the node may perform a scan of all potential LUN's which may be associated with the target device. The process then proceeds to step 760, in which the node caches a first logical unit number for performing additional inquiries relative to the LU's of the respective target device.

At step 770, a general inquiry is made relative to the cached LU associated with the current target. This inquiry, for example, may include a request for information concerning the type or configuration of the device represented by the LU (e.g., what is the device). Next, at step 780, another inquiry is made to obtain identifying characteristics or data associated with the device represented by the LU, such as its serial number. Once sufficient information has been collected to identify the device, the process may continue to step 790.

At step 790, a determination is made as to whether the identified LU is within the scope (data structure) of the node. In this example, pursuant to step 720, the scope is defined by the devices identified by the persistent inclusion list. If the LU is not within the node's scope, the process advances to step 800, in which the LU of the target device is added to the world, such as by storing its identifying characteristics in the world list. A flag associated with a device not within the scope optionally may be set to logical FALSE (e.g., visible=FALSE). Because, in this example, FALSE is a default state, no flag needs to be set explicitly.

If, at step 790, the identified LU is within the node's scope, however, the process proceeds to step 810 in which a flag is set to logical TRUE (e.g., visible=TRUE). From step 810, the process proceeds to step 820 in which a corresponding device object is created. The creation of the device object may be implemented by employing, for example, a private interface or PNP control. The device object is operatively associated with the current LU of the current target. Because a device object was created for the device, at step 846. the identifying data corresponding to device also is added to the list of instantiated objects (see FIGS. 2A–2C). The process then proceeds to step 800, in which identifying characteristics for the device also are added to the world list. The process then proceeds to step 850.

At step 850, a determination is made as to whether the current target device includes any additional LU's for which inquiries may be made. If an additional LU exists, the process proceeds to step 860 in which the next LUN is cached. The process then returns to step 770 to repeat the foregoing steps for the next LUN. If, at step 850, a determination is reached that no additional LU's exist (e.g., all LUN's of the current target have been processed), the process proceeds to step 870. At step 870, a determination is made as to whether there are any additional target devices associated with the bus being scanned. If this determination is affirmative, indicating additional targets are connected to the bus, the process returns to step 730, in which the node gets the address of the next target device connected to the current bus. The process is then repeated for each LU of the target device.

If the determination at step 870 is negative, indicating that no additional target devices are associated with the bus, the process proceeds to step 880. At step 880, a determination is made as to whether any additional buses are operatively associated with the node. If any bus has not yet been scanned and processed, the process returns to step 724, in which the next bus accessed is scanned in accordance with the foregoing process. If the determination at step 880 is negative, indicating that all the buses connected to the node have been processed, the process proceeds to step 884. At step 884, a higher level device object corresponding to a class driver for each device object is loaded and operatively linked to each respective device object that was created at step 820. This may be implemented, for example, by reporting to a PNP control results of the bus scan (e.g., including which devices are to masked). The PNP control, in turn, issues commands to the upper-level device drivers to attach themselves to the respective new device objects that have be selected to be within the node's scope. From step 884, the process ends at step 890. By implementing such methodology, the persistent inclusion list defines whether each device is within the initial node's scope. The remaining devices are not within the node's scope and, thus, are functionally hidden relative to the node. All operatively attached devices, however, are included in the world. It is to be appreciated that an exclusion list also may be employed, such that the devices identified on the list would be out of the node's scope and all other devices would be within the node's scope.

FIGS. 9A–9C are flow diagrams illustrating, by way of example, a methodology for programmatically modifying masking criteria associated with the node. This may be in response to employing the SET_INCLUSION_LIST interface, such as disclosed with respect to FIGS. 2A–2C. With reference to FIG. 9A, the process begins at step 950 by activating an interface, such as the SET_INCLUSION_LIST interface described herein. This interface, for example, may be a SCSI command, such as an input/output control. Appropriate configuration data is provided when employing the interface to identify the device being masked relative to the node, as well as whether the changes are being made to a persistent and/or temporary list. As mentioned above, this interface may be activated manually, such as by a system administrator, or be operation initiated, such as by a high level application or intelligent agent.

From step 950, the process proceeds to step 960 in which an appropriate inclusion list (temporary and/or persistent) is modified based on the interface characteristics that were provided. Next, at step 970, a new inclusion list is stored in appropriate memory, including the changes provided at step 960. By way of example, if changes are made to a persistent inclusion list, the revised list is stored in suitable non-volatile memory, such as the system registry. Changes made to a temporary inclusion list are stored, for example, in volatile memory, which remains in place so long as the system is running or the controller remains enabled. The process then proceeds to step 980, in which the scope control list is updated to correspond to the changes made to the inclusion list. It is to be appreciated that the scope control list may contain objects corresponding to the temporary or persistent lists or may include working copies of both lists stored in volatile memory. From step 980, the process proceeds to step 990 to implement masking of one or more devices in response to revisions made to the scope control list. FIGS. 9B and 9C are directed to two possible implementations of the masking methodology (step 990).

FIG. 9B describes a masking methodology generally corresponding to FIG. 2B and its accompanying description. Because masking may correspond to either exposing or hiding a selected device relative to the node, a first step 1000 after initiating the masking process step 990 corresponds to determining whether a device should be within the node's scope. This is based on, for example, whether the modified list is an inclusion list (identifying devices to be within the node's scope) or an exclusion list (identifying devices that are to be excluded from the node's scope). The determination also is dependent on whether the list has been revised to include an additional device or to delete an existing device. Provided that the masking data indicates that the device is to be within the node's scope, the process proceeds to step 1010.

At step 1010, a device object is created at the node for the device, such as stated above. Next, at step 1020, a flag associated with the device object is set to logical TRUE (e.g., visible=TRUE). The process then proceeds to step 1030, in which the list of instantiated objects is revised to include identifying data for the device corresponding to the device object just created (step 1010). From step 1030, the process proceeds to step 1050 to determine whether any additional devices are to be masked. If the determination is affirmative, indicating that additional devices require masking, the process proceeds to step 1060 to get the LU and/or other identifying data for the next device to be masked. From step 1060, the process returns to step 1000.

If at step 1000, the masking data indicates that the device is to be excluded from the node's scope, the process proceeds to step 1070. At step 1070, the device object corresponding to the device being masked is removed. This may be implemented, for example, by a private interface or a PNP control effecting the removal of the device object. Next, at step 1080, a flag associated with the device object may be set to logical FALSE (e.g., visible=FALSE). The process then proceeds to step 1090, in which the device object is removed from the list of instantiated objects. As a result, the device is functionally hidden relative to the node. The process then proceeds to step 1050 to determine whether any additional masking is still required. If the determination at step. 1050 is negative, the process proceeds to step 1100 in which a class driver is loaded and operatively linked to each respective device object that should be within the node's scope. As mentioned above, this may be implemented, for example in response to commands from a PNP control to the upper level drivers to attach to appropriate device objects, such as based on the VISIBLE flag condition. Once the class driver is loaded and linked to the device object, the device is within node's scope. From step 1100, the masking process ends at step 1110.

FIG. 9C illustrates another masking methodology, which may be implemented in accordance with the present invention. This masking aspect corresponds generally with the approach shown and described with respect to FIG. 2C. The process begins at step 990, in response to initiating a predefined masking process. The process then proceeds to step 1200, in which a determination is made as to whether the masking data indicates that the device being masked is to be within the node's scope. When the analysis reveals that the device is to be within the node's scope, the process proceeds to step 1210.

At step 1210, a determination is made as to whether the device being brought within the node's scope is a new device (not already part of the world). This may be determined by checking the world list maintained by the node for identifying data corresponding to the device or by checking the list of instantiated objects. It is to be recalled that, according to this aspect of the present invention, the link between a device object and its corresponding class driver is broken or blocked and the device object remains even though the device is not within the node's scope. Consequently, a device object is created for each device in the world. If the determination at step 1210 is affirmative, indicating the device is a newly added device, the process proceeds to step 1220.

Steps 1220–1250 are substantially identical to steps 1010–1030 of FIG. 9B. Briefly stated, at step 1220, a device object is created at the node for the device, such as by employing PNP or a private interface. The process then proceeds to step 1230, in which a flag associated with the device object is set to logic TRUE (e.g., visible=TRUE). Next. at step 1240, the list of instantiated objects is revised to include identifying data for the device being added. From step 1240, the process proceeds to step 1260 to determine whether additional devices require masking. If additional devices do require masking, the process proceeds to step 1270 in which the next LU or other identifying data associated with the device is loaded.

If the determination back at step 1210 is negative, indicating that the device being brought into the node's scope is not newly added to the system, the process proceeds to step 1280. At step 1280, an existing device object associated with the device is located and a corresponding flag condition is set to logic TRUE (e.g., visible=TRUE). The process then proceeds to step 1290 in which the device object is linked to a corresponding class driver. This functional aspect of linking the device object to a corresponding class driver may be handled by a PNP control or by a private interface issuing appropriate commands to an upper level class driver to link to a respective device object. From step 1290, the process proceeds to step 1260 to determine whether any additional devices are to be masked.

If, back at step 1200, it is determined that the masking data indicates that the device is to be removed from the node's scope, the process proceeds to step 1300. At step, 1300 the flag associated with the device object is set to logical FALSE (e.g., visible=FALSE). The process then proceeds to step 1310, in which the link between the device object and its corresponding class driver is broken. The removal may, for example, be handled as a removal request by an appropriate interface or PNP control. As a result of breaking the link, the device is effectively removed from the node's scope so that access by the node's controller to the device is blocked. Additional steps may be taken to secure any communication paths that go directly to the class driver, so that the communications path between the node and the device is blocked. From step 1310, the process proceeds to step 1260 to, as stated above, determine ii additional device require masking in accordance with the methodology of FIG. 9C. If no additional masking is required, the process proceeds to step 1320 in which a class driver is loaded and operatively linked to each respective device object that is to be within the node's scope (e.g., according to VISIBLE= TRUE). From step 1320, the process proceeds to step 1330, in which the process ends.

While the methodologies of FIGS. 9B and 9C have been described as being separate masking approaches, it is to be appreciated that a given node may be programmed and/or configured to implement both types of masking, as one type of masking may lend itself to being more desirable than the other. Moreover, hardware-based LUN masking also may be employed in conjunction with the programmatic masking described herein, such as in a SAN environment operatively connected to one or more nodes. The programmatic approach to LUN masking, in accordance with the present invention, enables a given node to effectively and dynamically mask access relative to one or more associated devices even where the hardware configuration may not be able. Moreover, the programmatic masking approach enables configuration changes to occur dynamically within a node without requiring reboot. As a result, multiple interconnected hosts are able to programmatically swap storage units or other shared devices.

What has been described above are examples of the present invention. It is, of course, not possible to described every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system, comprising:
   a shared storage system including a plurality of storage units;
   a node operatively connected to the shared storage system, the node being programmed to identify each storage unit operatively connected to the node and to mask access by the node to at least one of the storage units based on scope data that defines whether each identified storage unit is either exposed or hidden from the node.

2. The system of claim 1, wherein the scope data further includes a programmable data structure which identifies which of the storage units of the shared storage system are to be within the scope of the node, the node masking access to storage units based on the programmable data structure.

3. The system of claim 2, wherein the programmable data structure includes at least a portion corresponding to programmable persistent data.

4. The system of claim 3, wherein the programmable data structure further includes another portion corresponding to programmable temporary data.

5. The system of claim 2, wherein the node is further programmed to at least one of create and remove a programmatic link within the node that provides a communications channel between the node and a storage unit based on the programmable data structure.

6. The system of claim 5, wherein the programmatic link includes a device object associated with the node and a corresponding storage unit, the device object being instantiated based on the programmable data structure.

7. The system of claim 5, wherein the programmatic link includes a programmable connection that provides a communications path between a device object operatively associated with the node and a higher level device object operatively associated with one of the storage units, the communications path being masked according to the programmable data structure.

8. The system of claim 1, wherein the node further includes at least one of a programmable temporary data structure and a programmable persistent data structure which identify masking criteria of the node.

9. The system of claim 1, wherein the shared storage system further includes a storage area network operatively connecting the node to the plurality of storage units.

10. A system, comprising:
    a plurality of devices; and
    at least one bus connecting each of the plurality of devices to each of a plurality of nodes;
    wherein each of the plurality of nodes is programmed to identify each of the plurality of devices, each of the plurality of nodes having a programmable data structure and being programmable to mask access by the node to at least one of the plurality of devices according to the programmable data structure.

11. The system of claim 10, wherein the programmable data structure of a corresponding node identifies whether each of the plurality of devices is to be within the scope of the corresponding node, the corresponding node masking access to devices based on the programmable data structure associated therewith.

12. The system of claim 11, wherein the programmable data structure of the corresponding node includes programmable persistent data identifying at least one device to be masked relative to the corresponding node.

13. The system of claim 11, wherein the programmable data structure of the corresponding node includes programmable temporary data identifying at least one device to be masked relative to the corresponding node.

14. The system of claim 11, wherein the programmable data structure of the corresponding node includes programmable persistent data and programmable temporary data identifying devices to be masked relative to the corresponding node.

15. The system of claim 11, wherein each of the plurality of nodes is further programmed to at least one of add and remove a programmable link within the corresponding node based on the programmable data structure, the programmable link providing a communications channel between the corresponding node and one of the plurality of devices.

16. The system of claim 15, wherein the programmable link includes a device object associated with the corresponding node and a corresponding one of the plurality of devices, the device object being instantiated based on the programmable data structure.

17. The system of claim 15, wherein the programmable link includes a programmable communications path between a device object operatively associated with the corresponding node and a higher level device object operatively associated with one of the plurality of devices, the communications path being masked according to the programmable data structure of the corresponding node.

18. The system of claim 10, wherein the node further includes at least one of a programmable temporary data structure and a programmable persistent data structure which identify masking criteria for the node.

19. The system of claim 10, wherein at least some of the plurality of devices are storage units of a shared storage system operatively connected with the node through a storage area network.

20. A system for managing access to a plurality of storage units in a shared storage system, comprising:
   a node operatively connectable to the plurality of storage units, the node having a programmable data structure indicating whether each of the plurality of storage units is to be masked relative to the node; and
   an interface for selectively modifying the programmable data structure in response to a program instruction for masking access by the node relative to at least one of the plurality of storage units.

21. The system of claim 20, wherein the programmable data structure of the node includes programmable persistent data identifying at least one of the plurality of storage units to be masked relative to the node.

22. The system of claim 20, wherein the programmable data structure of the node includes programmable temporary data identifying at least one of the plurality of storage units to be masked relative to the node.

23. The system of claim 20, wherein the programmable data structure of the node includes programmable persistent data and programmable temporary data identifying storage units to be masked relative to the node.

24. The system of claim 20, wherein the node is further programmed to at least one of add and remove a programmable link that provides a communications channel between the node and a corresponding storage unit in response to changes in the programmable data structure.

25. The system of claim 24, wherein the programmable link includes a device object associated with the node and the corresponding storage unit, the device object being instantiated based on the programmable data structure.

26. The system of claim 24, wherein the programmable link includes a programmable communications path between a device object operatively associated with the node and a higher level object operatively associated with the corresponding storage unit, the communications path varying as a function of the programmable data structure.

27. A computer-readable storage medium having computer-executable instructions for performing the steps of:
   identifying storage units operatively connected to a node;
   masking access by the node relative to at least one programmatically selected storage unit based on scope data that defines whether each of the identified storage units is either exposed or hidden from the node.

28. A computer-readable storage medium having computer-executable instructions for performing the steps of:
   identifying storage units operatively connected to a node;
   creating a programmable data structure at the node indicative of selected storage units and that defines whether at least some of the identified storage units are either exposed or hidden from the node; and
   masking access by the node, relative to at least one of the storage units based on the programmable data structure.

29. The computer-readable storage medium of claim 28 having further computer-executable instructions for performing the step of storing in persistent memory of the node data which identifies at least one of the plurality of storage units to be masked relative to the node.

30. The computer-readable storage medium of claim 29 having further computer-executable instructions for performing the step of storing in temporary memory of the node data which identifies at least one of the plurality of storage units to be masked relative to the node.

31. The computer-readable storage medium of claim 30 having further computer-executable instructions for performing the step of defining the programmable data structure based on the data stored in at least one of the persistent memory and the temporary memory.

32. The computer-readable storage medium of claim 28 having further computer-executable instructions for performing the steps of storing in persistent memory of the node data which identifies at least one of the plurality of storage units to be masked relative to the node and defining the programmable data structure based on the data stored in the persistent memory.

33. The computer-readable storage medium of claim 28 having further computer-executable instructions for, in response to changes in the programmable data structure, performing the step of adding or removing a programmable link between the node and a corresponding one of the storage units.

34. The computer-readable storage medium of claim 33, wherein the programmable link includes a device object associated with the node and the corresponding one of the plurality of storage units, the computer-readable storage medium having further computer-executable instructions for performing the step of instantiating the device object based on the programmable data structure.

35. The computer-readable storage medium of claim 28, wherein the programmable link includes a programmable communications path between a device object operatively associated with the node and a higher level device object operatively associated with one of the storage units, the computer-readable storage medium having further computer-executable instructions for, in response to changes in the programmable data structure, performing the step of adding or removing the communications path.

36. A method to manage access to a plurality of shared storage units by a plurality of computers, comprising the steps of:
   programmatically identifying the plurality of storage units;
   programmatically masking access by at least one of the plurality of computers to at least one of the plurality of storage units based on scope data that defines whether the at least one of the plurality of storage units is either exposed or hidden from the at least one computer.

37. The method of claim 36, further including the step of storing a programmable data structure at the at least one computer indicative of masking criteria of whether a storage unit is to be masked relative to the at least one computer, the step of programmatically masking being performed based on the programmable data structure.

38. The method of claim 37, further including the step of storing in persistent memory of the at least one computer data which identifies at least one of the plurality of storage units to be masked relative to the at least one computer.

39. The method of claim 38, further including the step of storing in temporary memory of the at least one computer data which identifies at least one of the plurality of storage units to be masked relative to the at least one computer.

40. The method claim 39, further including the step of defining the programmable data structure based on the data stored in at least one of the persistent memory and the temporary memory.

41. The method of claim 37, further including the steps of storing in the at least one computer at least one of persistent and temporary data which identifies at least one of the plurality of storage units to be masked relative to the at least one computer and defining the programmable data structure based on the at least one of persistent and temporary data.

42. The method of claim 37, further including the step of adding or removing a programmable link at the at least one computer that provides a communications channel between the at least one computer and a corresponding storage unit in response to changes in the programmable data structure.

43. The method of claim 42, wherein the programmable link includes a device object associated with the at least one computer and a corresponding one of the plurality of storage units, the method further including the step of instantiating the device object at the at least one computer based on the programmable data structure.

44. The method of claim 42, wherein the programmable link includes a programmable communications path between a device object operatively associated with the at least one computer and a higher level device object operatively associated with one of the storage units, the method further including the step of adding or removing the communications path in response to changes in the programmable data structure.

* * * * *